ized Patent No.: US 12,190,498 B2
(45) Date of Patent: Jan. 7, 2025

(12) United States Patent
Patwary et al.

(54) PRINT CHECK REPEATER DEFECT DETECTION

(71) Applicant: KLA Corporation, Milpitas, CA (US)

(72) Inventors: Nurmohammed Patwary, San Jose, CA (US); James A. Smith, Los Altos, CA (US); Heonju Shin, Yongin-si (KR); Jusang Maeng, Seoul (KR); Kenong Wu, Davis, CA (US); Xiaochun Li, San Jose, CA (US); Hucheng Lee, Cupertino, CA (US)

(73) Assignee: KLA Corp., Milpitas, CA (US)

( * ) Notice: Subject to any disclaimer, the term of this patent is extended or adjusted under 35 U.S.C. 154(b) by 239 days.

(21) Appl. No.: 18/072,605

(22) Filed: Nov. 30, 2022

(65) Prior Publication Data

US 2024/0177294 A1 May 30, 2024

(51) Int. Cl.
*G06T 7/00* (2017.01)
*G06T 5/50* (2006.01)
*G06V 10/74* (2022.01)

(52) U.S. Cl.
CPC ............... *G06T 7/001* (2013.01); *G06T 5/50* (2013.01); *G06V 10/761* (2022.01); *G06T 2207/20221* (2013.01); *G06T 2207/20224* (2013.01); *G06T 2207/30148* (2013.01)

(58) Field of Classification Search
CPC . G06T 7/001; G06T 5/50; G06T 2207/20221; G06T 2207/20224; G06T 2207/30148; G06V 10/761
See application file for complete search history.

(56) References Cited

U.S. PATENT DOCUMENTS

| | | | |
|---|---|---|---|
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 2009/0196487 A1* | 8/2009 | Yishai | G06T 7/0004 382/145 |
| 2016/0321800 A1* | 11/2016 | Thattaisundaram | G01N 21/95607 |
| 2018/0130199 A1* | 5/2018 | Brauer | G06T 7/0006 |

(Continued)

OTHER PUBLICATIONS

International Search Report and Written Opinion for PCT/US2023/080180 mailed Mar. 20, 2024.

*Primary Examiner* — Samir A Ahmed
(74) *Attorney, Agent, or Firm* — Ann Marie Mewherter

(57) ABSTRACT

Systems and methods for detecting defects on a reticle are provided. One system is configured for generating different stacked difference images for multiple instances of first patterned areas in different rows on a wafer based on images generated for the first patterned areas in the different rows. The system is also configured for performing double detection based on the different stacked difference images. The system then identifies defects on the reticle based on the defects detected by the double detection. As described further herein, the systems and methods detect defects from multiple reticle rows printed on a wafer, which can reduce noise and enable detection of substantially small repeater defects. The embodiments are particularly useful for high sensitivity repeater defect detection for extreme ultraviolet (EUV) reticles and multi-die reticles (MDR).

30 Claims, 11 Drawing Sheets

(56) References Cited

U.S. PATENT DOCUMENTS

| | | | |
|---|---|---|---|
| 2018/0328860 A1* | 11/2018 | Suman | G01N 21/95607 |
| 2018/0348147 A1 | 12/2018 | Shifrin et al. | |
| 2019/0346376 A1 | 11/2019 | Brauer et al. | |
| 2020/0240928 A1 | 7/2020 | Shifrin et al. | |
| 2021/0342992 A1 | 11/2021 | Chen et al. | |
| 2022/0058787 A1 | 2/2022 | Lin et al. | |

* cited by examiner

PRINT CHECK REPEATER DEFECT DETECTION

BACKGROUND OF THE INVENTION

1. Field of the Invention

The present invention generally relates to systems and methods for repeater defect detection on print check wafers to detect defects on reticles such as extreme ultraviolet (EUV) single die and multi-die reticles.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Some current inspection methods detect repeater defects on wafers to thereby detect defects on reticles. For example, if a defect is detected repeatedly ("a repeater defect") at multiple locations on a wafer corresponding to the same location on a reticle, the defects may be caused by the reticle itself. Therefore, repeater defects may be analyzed to determine if they are caused by reticle defects, rather than some other cause.

In general, repeater defect detection (RDD) is performed as a wafer post-processing (PP) operation. For example, the inspection tool may perform normal die-to-die defect detection (DD) in a multi-die reticle case, and after all wafer defects are reported, the RDD may be performed in a post-processing step. The repeater defects are defined in this filing as defects positioned at the same location (within a certain tolerance) in several reticles.

There are, however, several disadvantages to the currently used methods and systems for RDD. For example, many currently used RDD methods and systems have been created to try to reduce noise so that repeater defects can be detected more accurately, with fewer detected nuisances, and with higher sensitivity. However, many attempts at wafer noise reduction are not capable of detecting smaller sizes of EUV repeater defects required for next generation design rules. For example, some currently used RDD methods use a setup wafer for steps like image alignment. The setup wafer and a test wafer may have relatively small differences caused by, for example, process condition variation. Those differences in the wafers may be enough to cause errors in image alignment, which can thereby cause noise in the defect detection results. That noise then can effectively cause errors in the defect detection results like missed defects, nuisances and noise being detected as defects, and the like.

Accordingly, it would be advantageous to develop systems and methods for detecting repeater defects on a wafer and thereby defects on a reticle that do not have one or more of the disadvantages described above.

SUMMARY OF THE INVENTION

The following description of various embodiments is not to be construed in any way as limiting the subject matter of the appended claims.

One embodiment relates to a system configured to detect defects on a reticle. The system includes an inspection subsystem configured to generate images for the wafer. A reticle is used to print patterned areas on the wafer in a lithography process. The patterned areas include first patterned areas corresponding to the same area on the reticle and printed in different rows on the wafer. The system also includes a computer subsystem configured for generating different stacked difference images for multiple instances of the first patterned areas in the different rows based on the images generated for the first patterned areas in the different rows by the inspection system. The computer subsystem is also configured for detecting defect candidates in the multiple instances of the first patterned areas on the wafer by applying a defect detection method to the different stacked difference images. The defect detection method determines that a defect candidate is present at a location in each of the multiple instances of the first patterned areas only when the defect detection method detects the defect candidate at the location in the different stacked difference images. The computer subsystem is further configured for identifying defects on the reticle based on the detected defect candidates. The system may be further configured as described herein.

Another embodiment relates to a computer-implemented method for detecting defects on a reticle. The method includes acquiring images generated for a wafer by an inspection subsystem. A reticle is used to print patterned areas on the wafer in a lithography process. The patterned areas include first patterned areas corresponding to the same area on the reticle and printed in different rows on the wafer. The method also includes the generating, detecting, and identifying steps described above, which are performed by a computer subsystem coupled to the inspection subsystem.

Each of the steps of the method may be further performed as described herein. The method may include any other step(s) of any other method(s) described herein. The method may be performed by any of the systems described herein.

Another embodiment relates to a non-transitory computer-readable medium storing program instructions executable on a computer system for performing a computer-implemented method for detecting defects on a reticle. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
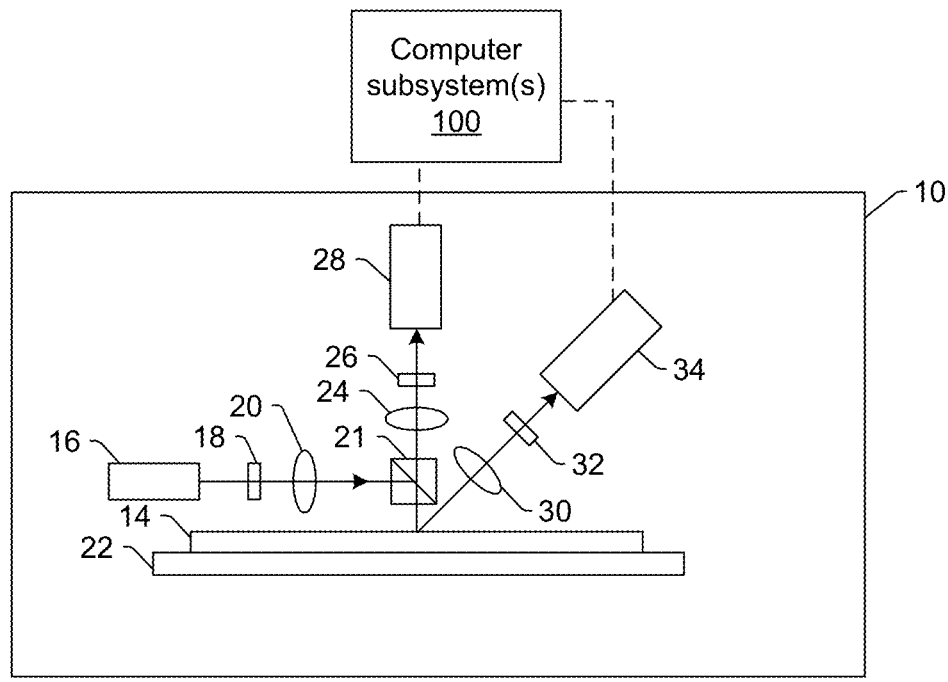
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to detect defects on a reticle. The embodiments described herein provide new and improved methods and systems for high sensitivity repeater defect detection (RDD) for detection of mask defects by inspection of a wafer printed with the mask. The terms "reticle" and "mask" are used interchangeably herein. The term "repeaters" is used interchangeably herein with the term "repeater defects."

One embodiment of such a system is shown in FIG. 1. The system includes an inspection subsystem configured to generate images for the wafer. The inspection subsystems described herein may include at least an energy source and a detector. The energy source is configured to generate energy that is directed to a wafer. The detector is configured to detect energy from the wafer and to generate output (e.g., images) responsive to the detected energy.

In one embodiment, the energy directed to the wafer includes light, and the energy detected from the wafer includes light. For example, in the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the wafer at one or more angles of incidence, which may include one or more oblique angles and/or one or more normal angles. For example, as shown in FIG. 1, light from light source 16 is directed through optical element 18 and then lens 20 to beam splitter 21, which directs the light to wafer 14 at a normal angle of incidence. The angle of incidence may include any suitable angle of incidence, which may vary depending on, for instance, characteristics of the wafer and the defects to be detected on the wafer.

The illumination subsystem may be configured to direct the light to the wafer at different angles of incidence at different times. For example, the inspection subsystem may be configured to alter one or more characteristics of one or more elements of the illumination subsystem such that the light can be directed to the wafer at an angle of incidence that is different than that shown in FIG. 1. In one such example, the inspection subsystem may be configured to move light source 16, optical element 18, and lens 20 such that the light is directed to the wafer at a different angle of incidence.

In some instances, the inspection subsystem may be configured to direct light to the wafer at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the wafer at the same time as the other light, one or more characteristics (e.g., wavelength, polarization, etc.) of the light directed to the wafer at different angles of incidence may be different such that light resulting from illumination of the wafer at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the wafer. Multiple illumination channels may be configured to direct light to the wafer at the same time or at different times (e.g., when different illumination channels are used to sequentially illuminate the wafer). In another instance, the same illumination channel may be configured to direct light to the wafer with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the wafer at different times. The illumination subsystem may have any other suitable configuration known in the art for directing the light having different or the same characteristics to the wafer at different or the same angles of incidence sequentially or simultaneously.

In one embodiment, light source 16 may include a broadband plasma (BBP) light source. In this manner, the light generated by the light source and directed to the wafer may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the wafer. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to cause the light to be scanned over the wafer. For example, the inspection subsystem may include stage 22 on which wafer 14 is disposed during inspection. The scanning subsystem may include any suitable mechanical and/or robotic assembly (that includes stage 22) that can be configured to move the wafer such that the light can be scanned over the wafer. In addition, or alternatively, the inspection subsystem may be configured such that one or more optical elements of the inspection subsystem perform some scanning of the light over the wafer. The light may be scanned over the wafer in any suitable fashion.

The inspection subsystem further includes one or more detection channels. At least one of the one or more detection channels includes a detector configured to detect light from the wafer due to illumination of the specimen by the inspection subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the wafer (e.g., specularly reflected light). Although FIG. 1 shows an embodiment of the inspection subsystem that includes two detection channels, the inspection subsystem may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection subsystem may be signals or data, but not image signals or image data. In such instances, a computer subsystem described further herein may be configured to generate images of the wafer from the non-imaging output of the detectors. In other instances, the detectors may be configured as imaging detectors that are configured to generate image signals or image data. Therefore, the system may be configured to generate the images described herein in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the system as is normally performed when designing a commercial inspection system. In addition, the systems described herein may be implemented using an existing inspection system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem(s) 100 of the system may be coupled to the detectors of the inspection subsystem in any suitable manner (e.g., via one or more transmission media, which may include "wired" and/or "wireless" transmission media) such that the computer subsystem(s) can receive the output generated by the detectors during scanning of the wafer. Computer subsystem(s) 100 may be configured to perform a number of functions using the output of the detectors as described herein and any other functions described further herein. Computer subsystem(s) 100 may be further configured as described herein.

Computer subsystem(s) 100 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device, adapted according to the various embodiments described herein. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and SW, either as a standalone or a networked tool.

If the system includes more than one computer subsystem, the computer subsystems may be coupled to each other such that images, data, information, instructions, etc. can be sent between the various computer subsystems. For example, different computer subsystems may be coupled to each other by any suitable transmission media, which may include any suitable wired and/or wireless transmission media known in the art. Two or more of the computer subsystems may also be effectively coupled by a shared computer-readable and -writable storage medium (not shown).

Although the inspection subsystem is described above as being an optical or light-based inspection subsystem, the inspection subsystem may be an electron beam-based inspection subsystem. For example, in one embodiment, the energy directed to the wafer includes electrons, and the energy detected from the wafer includes electrons. In this manner, the energy source may be an electron beam source. In one such embodiment shown in FIG. 2, the inspection subsystem includes electron column 122, which is coupled to computer subsystem(s) 200.

Figure 2:
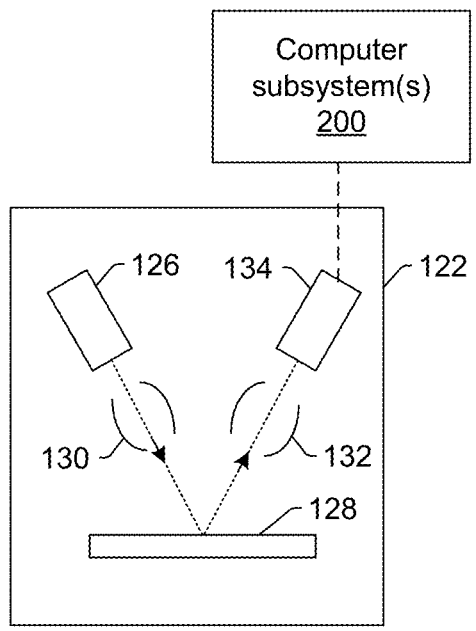

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the wafer at an oblique angle of incidence and are scattered from the wafer at another oblique angle, the electron beam may be directed to and scattered from the wafer at any suitable angles. In addition, the electron beam-based subsystem may be configured to use multiple modes to generate images of the wafer (e.g., with different illumination angles, collection angles, etc.). The multiple modes of the electron beam-based subsystem may be different in any image generation parameters of the subsystem.

Computer subsystem(s) 200 may be coupled to detector 134 as described above. The detector may detect electrons returned from the surface of the wafer thereby forming electron beam images of the wafer. The electron beam images may include any suitable electron beam images. Computer subsystem(s) 200 may be configured to perform any of the functions described herein using the output of the detector and/or the electron beam images. Computer subsystem(s) 200 may be configured to perform any additional step(s) described herein. A system that includes the inspection subsystem shown in FIG. 2 may be further configured as described herein.

It is noted that FIG. 2 is provided herein to generally illustrate a configuration of an electron beam-based inspection subsystem that may be included in the embodiments described herein. As with the optical inspection subsystem described above, the electron beam-based inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system). For some such systems, the methods described herein may be provided as optional functionality of the system (e.g., in addition to other functionality of the system). Alternatively, the system described herein may be designed "from scratch" to provide a completely new system.

Although the inspection subsystem is described above as being a light- or electron beam-based inspection subsystem, the inspection subsystem may be an ion beam-based inspection subsystem. Such an inspection subsystem may be configured as shown in FIG. 2 except that the electron beam source may be replaced with any suitable ion beam source known in the art. In addition, the inspection subsystem may be any other suitable ion beam-based subsystem such as those included in commercially available focused ion beam (FIB) systems, helium ion microscopy (HIM) systems, and secondary ion mass spectroscopy (SIMS) systems.

As noted above, the inspection subsystems may be configured for directing energy (e.g., light, electrons) to and/or scanning energy over a physical version of the wafer thereby generating actual images for the physical version of the wafer. In this manner, the inspection subsystems may be configured as "actual" imaging systems, rather than "virtual" systems. A storage medium (not shown) and computer subsystem(s) 100 shown in FIG. 1 may be configured as a "virtual" system. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

As further noted above, the inspection subsystem may be configured to have multiple modes. In general, a "mode" is defined by the values of parameters of the inspection subsystem used to generate output for the specimen. Therefore, modes that are different may be different in the values for at least one of the optical or electron beam parameters of the inspection subsystem (other than position on the specimen at which the output or images are generated). For example, for a light-based inspection subsystem, different modes may use different wavelengths of light. The modes may be different in the wavelengths of light directed to the specimen as described further herein (e.g., by using different light sources, different spectral filters, etc.) for different modes. In another embodiment, different modes may use different illumination channels. For example, as noted above, the inspection subsystem may include more than one illumination channel. As such, different illumination channels may be used for different modes.

The multiple modes may also be different in illumination and/or collection/detection. For example, as described further above, the inspection subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The inspection subsystem may be configured to scan the specimen with the different modes in the same scan or different scans, e.g., depending on the capability of using multiple modes to scan the specimen at the same time.

A reticle is used to print patterned areas on a wafer in a lithography process. The lithography process may include any suitable lithography process. In general, a lithography process uses some form of energy (e.g., light, electrons, etc.) to transfer a pattern formed on a reticle to a material on a wafer. The material on the wafer may be some form of resist, one or more properties of which change after exposure to the energy used in the lithography process. In this manner, a pattern of energy (light, electrons, etc.) can be directed from or through a reticle to a resist on a wafer to thereby transfer the pattern from the reticle to the resist. One or more additional steps may be performed on the resist (e.g., post exposure bake, development, etc.) to complete the pattern transfer process. Therefore, as can be clearly seen from this general description of lithography processes, defects that are present on a reticle can be transferred to a wafer in the lithography process, which is obviously disadvantageous. Sometimes it is not possible or practical to inspect a reticle directly, as in a reticle inspection process. In such instances, the reticle is printed on a wafer, the wafer is inspected for defects, and those wafer defects are used to determine if the defects are caused by the reticle. Such determinations may be performed as described further herein.

In one embodiment, the reticle is a single die reticle (SDR). In another embodiment, the reticle is a multiple die reticle (MDR). For example, the embodiments described herein can be used for both SDR inspections, in which a mask contains only one die, and MDR, in which a mask contains several identical dies.

In a further embodiment, the reticle is configured for use at an extreme ultraviolet (EUV) wavelength. Such a mask may then be referred to as an EUV mask. In other words, the mask may be configured for use in a lithography process that uses one or more EUV wavelengths of light to transfer the pattern from the mask to a wafer (e.g., by reflecting the EUV light off the mask to the wafer). In this manner, the actinic wavelength of the mask (i.e., the wavelength of light that is used to transfer a pattern from the mask to a wafer thereby causing a photochemical reaction in one or more materials on the wafer, e.g., a photoresist) may be an EUV wavelength. Although the embodiments described herein are particularly useful for defect detection on EUV masks, the embodiments may also be used for defect detection on other types of SDR and MDR such as masks designed for use at one or more deep ultraviolet (DUV) wavelengths of light (i.e., single- or multi-die, optical or DUV masks).

The embodiments described herein provide substantially high sensitivity repeater defect detection (RDD) for EUV print check. "Print check" is defined herein as a type of mask inspection that involves printing the mask on a wafer, inspecting the wafer, and identifying defects on the mask based on the wafer inspection results. Print check may be used for a variety of applications including identifying reticle repeaters for EUV mask qualification and/or monitoring, which may be performed to routinely or regularly check EUV masks released to production for possible contamination. Print check can be used for both SDR and MDR. In the embodiments described herein, reference images from multiple reticle rows are used to generate difference images and difference images from or across reticle rows are stacked for improved noise reduction, which enables detection of smaller sizes of EUV MDR repeater defects on print check wafers.

The patterned areas include first patterned areas corresponding to the same area on the reticle and printed in different rows on the wafer. In this manner, the "rows" described herein are "reticle rows" printed on the wafer, each of which is defined as a row of multiple instances of an entire reticle printed on the wafer. For a single die reticle, each row of dies printed on a wafer may correspond to a row of reticle instances printed on the wafer. However, more than one row of dies printed on a wafer may correspond to a single row of reticle instances printed on the wafer with an MDR. For example, when an MDR that includes multiple rows of dies is printed on the wafer once, that one reticle instance will include multiple rows of dies. In this manner, when such a reticle is printed multiple times in a single row across the wafer, the row will include multiple rows of dies. For the embodiments described herein, different rows refers to different reticle rows, which may or may not be different die rows.

The images of the first patterned areas generated by the inspection subsystem correspond to different instances of the same area on the reticle printed on the wafer. What constitutes different instances of the same area of a reticle printed on a wafer may vary depending on whether the reticle is an SDR or an MDR. For example, for an SDR, the different instances of the same area on the reticle printed on the wafer may be corresponding areas in different dies separately printed on the wafer using the reticle. In the case of an MDR, the different instances of the same area on the reticle printed on the wafer may be corresponding areas in different instances of the reticle printed on the wafer. In such instances, the corresponding areas of the MDR may be multiple instances of the same area of only one of the dies on the MDR.

Figure 3:
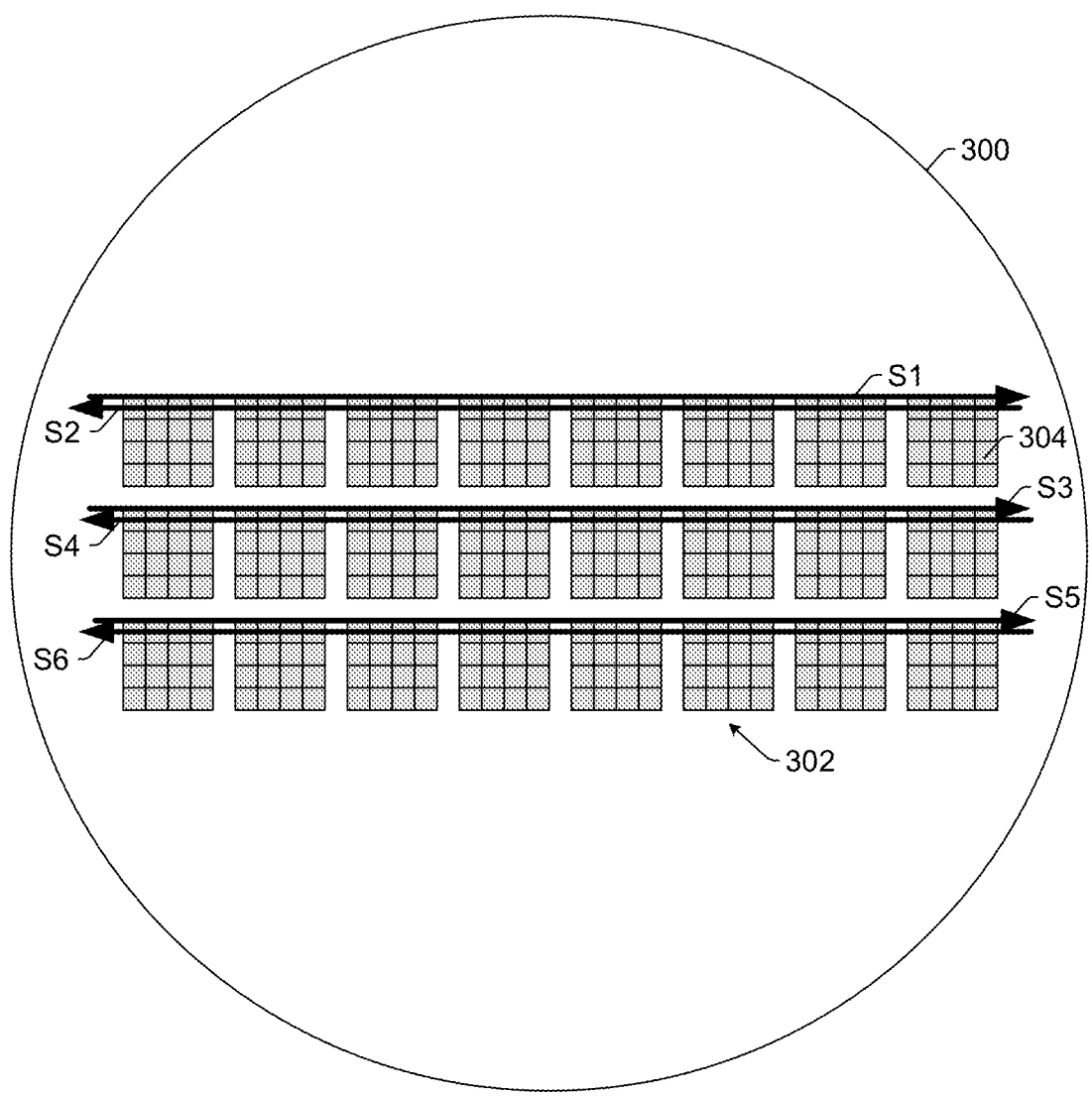
FIG. 3 is a schematic diagram illustrating a plan view of one example of a wafer with patterned areas printed thereon with a reticle and one embodiment of interleaved scanning of different rows on the wafer performed by an inspection subsystem.

In one embodiment, the inspection subsystem is configured to generate the images by interleaving scanning of the first patterned areas in the different rows on the wafer with scanning of a second of the patterned areas in the different rows on the wafer. FIG. 3 illustrates one embodiment of a reticle-based interleaved swathing (i.e., scanning) strategy that may be used for the embodiments described herein. The reticle-based interleaved swathing strategy swaths through (i.e., scans) the same Y locations of the printed reticle instances on the wafer across multiple reticle rows, as shown in FIG. 3. For example, as shown in FIG. 3, wafer 300 may have reticle instances 302 formed thereon. In the case of an MDR, each reticle instance contains multiple dies 304, which may be configured as described further herein. In this embodiment, the inspection subsystem may scan S1, S2, S3, S4, S5, and S6 in that order. S1, S3, and S5 all correspond to the same Y locations of the reticle instances in each of the different rows. Similarly, S2, S4, and S6 all correspond to the same Y locations of the reticle instances in each of the different rows, which are different than the Y locations of S1, S3, and S5. (There may of course be some overlap in Y between S1 and S2, S3 and S4, and S5 and S6 to ensure that the entirety of the reticle instances are inspected, but S1 and S2, S3 and S4, and S5 and S6 still have different Y locations.) This reticle-based interleaved swathing strategy is different from currently used die-based interleaved swathing strategies. The reticle-based interleaved swathing strategy ensures that the reference images across reticle rows can be used for the computed reference (CR) image generation and difference image stacking described further herein.

As described above, the swathing strategy shown in FIG. 3 scans the swaths in the following order: S1, S2, S3, S4, S5, and S6 (of course more than 6 swaths are possible as well). The system may then inspect S1 and S3 simultaneously as described further herein and S2 and S4 simultaneously as described further herein. In other words, swaths generated at different Y locations with respect to the reticle area are processed separately for defect detection. In this manner, defect detection is performed for S1, S3, and S5 separately from defect detection performed for S2, S4, and S6. Once the first set of two reticle rows are done, the system may then move on to inspection involving the third row (e.g., inspecting S1 and S3 then inspecting S3 and S5). As described further herein, however, more than two (e.g., 3) reticle rows can also be inspected together (e.g., inspecting S1, S3, and S5 simultaneously). For the embodiments described herein, at least two reticle rows are scanned and then processed simultaneously. In this manner, scanning of a first set of the swaths that are processed together is interleaved with scanning of other swaths that are processed together and separately from the first set of swaths.

Although the interleaved swathing strategy described herein and shown in FIG. 3 is particularly advantageous for the embodiments described herein, the systems and methods described herein may be used with any other suitable type of swathing strategy known in the art. The appropriate swathing strategy may be selected based on a number of system configuration factors such as the available memory for temporarily storing the images of the swaths that are to be processed together for defect detection.

When any two or more images generated at different locations on a wafer are used together for some purpose, some type of image alignment should be performed to make sure that the images are properly aligned to each other (e.g., for image subtraction, for CR generation, etc.). One particularly advantageous way that the embodiments described herein may perform such image alignment is to use an alignment die located in the first reticle row that is swathed to align other reticle rows. For example, an image generated by the inspection subsystem in the first die scanned in swath S1 may be used as the alignment die for aligning the images generated in that swath to each other and with the images generated in other swaths. Alignment using such an image as the alignment die may otherwise be performed in any suitable manner known in the art. While this is one particularly useful method for aligning images between different rows or swaths, the embodiments may also be used with any other suitable alignment method known in the art.

In one such embodiment, the first patterned areas and a second of the patterned areas correspond to different portions of a die on the reticle. For example, when a dimension in the Y direction across the wafer of the swaths is less than a dimension in the Y direction of a die printed on the wafer, more than one swath may be scanned on the wafer to cover the entirety of the die. In this manner, the different patterned areas in the different rows on the wafer (e.g., the different patterned areas in S1 and S2) that correspond to different portions of the same die on the reticle may have different patterned features formed therein. Therefore, in the embodiments described herein, such patterned areas would be processed separately for defect detection.

In another such embodiment, the first patterned areas and a second of the patterned areas correspond to different instances of a die on the reticle printed on the wafer. For example, when a dimension in the Y direction across the wafer of the swaths is equal to or greater than a dimension in the Y direction of a die printed on the wafer, one swath may be scanned on the wafer to cover the entirety of the die. In this manner, the different patterned areas in the different rows on the wafer (e.g., the different patterned areas in S1 and S2) may correspond to different dies on the wafer. In some such instances, the different dies on the wafer covered by the different swaths may be printed in the same reticle row (e.g., as in when a single printing of a reticle on a wafer results in multiple rows of dies, and each swath covers a row of those dies). In other such instances, the different dies on the wafer covered by the different swaths may be printed in different reticle rows (e.g., as in when a single printing of a reticle on a wafer results in a single row of dies, and each swath covers a row of those dies).

In some embodiments, the reticle is an MDR, and the first patterned areas include at least a portion of only a first die of the MDR printed on the wafer. For example, the first patterned areas may correspond to only one die of an MDR, each of which is printed in a different instance of the MDR on the wafer. In this case, each of those first patterned areas may correspond to an entirety of that die printed on a wafer or less than all of that die printed on the wafer. In this manner, in one row of repeating patterned areas printed on the wafer with an MDR, the first patterned areas may correspond to a first die of the MDR printed in the row, the second patterned areas may correspond to a second die of the MDR printed in the row, and so on.

The system also includes a computer subsystem configured for generating different stacked difference images for multiple instances of the first patterned areas in the different rows based on the images generated for the first patterned areas in the different rows by the inspection subsystem. The embodiments described herein provide new methods and systems for CR image generation and difference image stacking. In the embodiments described herein, reference images from multiple reticle rows are used to generate difference images and/or difference images from and/or across reticle rows are stacked. There are several ways described herein to perform this step but what is common to all of the various ways is that the images that are used to generate input to the defect candidate detection step include images generated from patterned areas formed in different rows on the wafer. These new ways to generate input for the defect candidate detection step provide several important improvements for the embodiments described herein compared to currently used systems and methods for reticle defect detection. For example, the four new approaches described further herein provide advantages such as maximum noise reduction and maximum nuisance suppression.

In contrast to the embodiments described herein, some currently used methods and systems for print check use reference images from the same reticle row and stack difference images within the reticle row to achieve noise reduction. However, such wafer noise reduction is not enough to detect the smaller sizes of EUV repeater defects required for next generation design rules. Some currently used methods for print check type reticle inspection require training which stores a full die image from a setup wafer and use it to align with a production wafer. Since the setup wafer and the production wafer may be different for a number of reasons such as being processed with different process conditions due to process drift, the alignment die image from the setup wafer may have color variation compared to production wafer images and any image misalignment caused thereby may introduce false defects at runtime.

In one embodiment, generating a first of the different stacked difference images ("Stacked Diff1") includes generating first and second difference images and combining at least a portion of the first and second difference images to generate Stacked Diff1, and generating a second of the different stacked difference images ("Stacked Diff2") includes generating third and fourth difference images and combining at least a portion of the third and fourth difference images to generate Stacked Diff2. This step is common to the first three approaches described herein.

Figure 4:
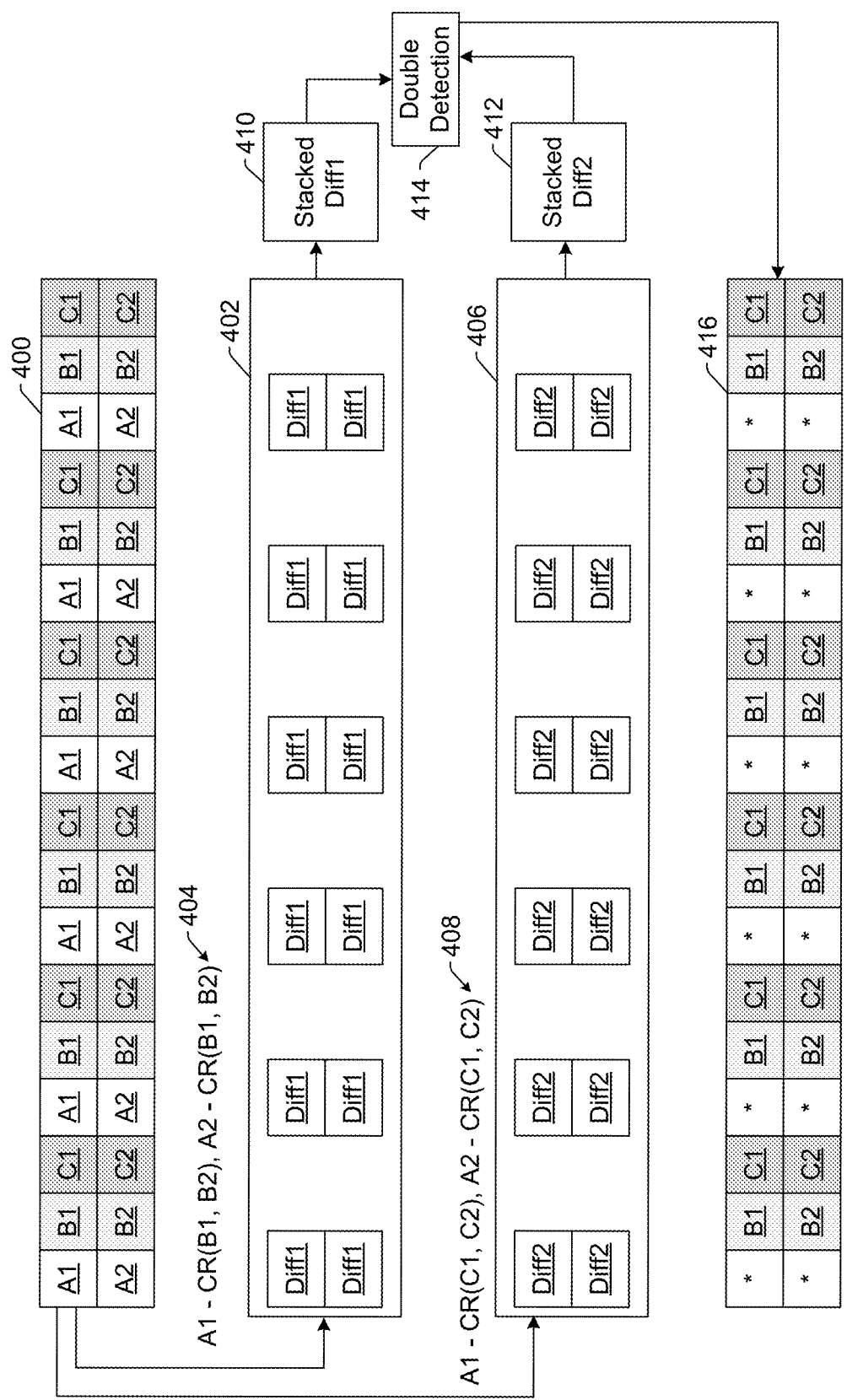
FIGS. 4-7 are flow charts illustrating embodiments of the generating different stacked difference images and detecting defect candidates steps that may be performed for detecting defects on a reticle.
Figure 9:
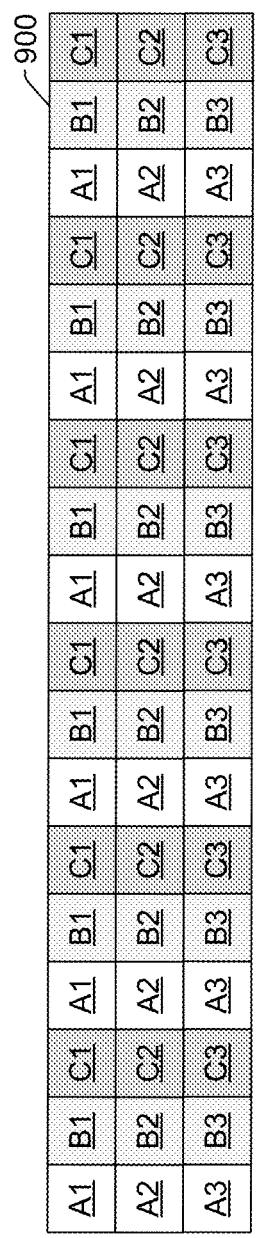
FIG. 9 is a schematic diagram illustrating a plan view of test images generated for three rows of patterned areas printed on a wafer that may be processed collectively to detect defects on a reticle.

The first approach ("Type1") shown in FIG. 4 uses reference images from 2 rows to create CR images for each test image and stacks the resultant difference images across 2 rows for maximum noise reduction. In this and other embodiments described herein, A1 and A2 refer to different instances of a patterned area printed on a wafer (not shown in FIG. 4) with a reticle in a lithography process that correspond to the same area on the reticle and printed in different rows on the wafer. Similarly, B1 and B2 (and C1 and C2) refer to different instances of a patterned area printed on the wafer with the reticle in the lithography process that correspond to the same area on the reticle and printed in different rows on the wafer. In this manner, A1 and A2 correspond to different instances of the same portion of a die printed on a wafer with an MDR, B1 and B2 correspond to different instances of the same portion of a different die printed on the wafer with the MDR, and C1 and C2 correspond to different instances of the same portion of another, different die printed on the wafer with the MDR. In this manner, test images 400 may be generated for A1, A2, B1, B2, C1 and C2 by scanning two different rows on the wafer. For example, in S1 shown in FIG. 3, test images for A1, B1, and C1 may be generated, and each set of A1, B1, and C1 in test images 400 shown in FIG. 4 may be generated for a single MDR instance printed on the wafer. In S3 in FIG. 3, test images for A2, B2, and C2 may be generated, and each set of A2, B2, and C2 in test images 400 shown in FIG. 4 may be generated for a single MDR instance printed on the wafer. In a similar manner, in S5 shown in FIG. 3, test images for A3, B3, and C3 may be generated (as shown in FIG. 9), and each set of A3, B3, and C3 may be generated for a single MDR instance printed on the wafer.

Each of A1, A2, B1, B2, C1 and C2 shown in FIG. 4 and other figures described herein may include only a portion of the dies in the Y direction and possibly the entirety of the dies in the X direction. In other words, each of A1, A2, B1, B2, C1 and C2 shown in FIG. 4 and other figures described herein may be generated by scanning a swath having a height in Y that is smaller than the height of the dies and covers the entire width of the dies in the X direction for the height of the swath. Alternatively, each of A1, A2, B1, B2, C1 and C2 shown in FIG. 4 and other figures described herein may include the entirety of the dies in both the X and Y directions.

In one such embodiment, generating the first difference images includes separately subtracting a first CR from the images generated for the multiple instances of the first patterned areas in a first of the different rows on the wafer and generating the second difference images includes separately subtracting the first CR from the images generated for the multiple instances of the first patterned areas in a second of the different rows on the wafer. For example, in FIG. 4, generating the first difference images (e.g., the top row of set 402 of Diff1) includes separately subtracting a first CR from the images generated for A1 and generating the second difference images (e.g., the bottom row of set 402) includes separately subtracting the first CR from the images generated for A2, as shown in step 404. All of the image subtractions described herein may be performed in any suitable manner known in the art.

In some such embodiments, the computer subsystem is configured for generating the first CR from the images of multiple instances of a second of the patterned areas in the different rows on the wafer. For example, as shown in FIG. 4, the first CR subtracted from A1 in step 404 may be generated as CR(B1, B2). This same CR may be separately subtracted from A2 as shown in step 404. This CR and all other CRs described herein may be generated in any suitable manner known in the art.

In one embodiment, CR(B1, B2) indicates that the CR is computed from images of every instance of B1 and B2 scanned in the two rows. However, the B1 and B2 images used to generate this CR may include images of fewer than all of the B1 and B2 patterned areas scanned in the two rows. For example, such a CR may in some instances be generated from a single B1 image and a single B2 image, but as the number of reference images used to generate the CR increases, the quality of the CR will generally increase. Therefore, it may be desirable but not necessary to use all of the available reference images to generate a CR. The same can be said for all of the other CRs described herein.

In additional embodiments, generating the third difference images includes separately subtracting a second CR from the images generated for the multiple instances of the first patterned areas in the first of the different rows on the wafer and generating the fourth difference images includes separately subtracting the second CR from the images generated for the multiple instances of the first patterned areas in the second of the different rows on the wafer. For example, in FIG. 4, generating the third difference images (e.g., the top row of set 406 of Diff2) includes separately subtracting a second CR from the images generated for A1 in step 408 and generating the fourth difference images (e.g., the bottom row of set 406) includes separately subtracting the second CR from the images generated for A2, as shown in step 408.

In another embodiment, the computer subsystem is configured for generating the second CR from the images of multiple instances of a third of the patterned areas in the different rows on the wafer. For example, as shown in FIG. 4, the second CR subtracted from A1 in step 408 may be generated as CR(C1, C2). This same CR may be separately subtracted from A2, as shown in step 408.

As shown in FIG. 4, the computer subsystem may generate Stacked Diff1 410 by combining at least a portion of the first and second difference images (i.e., at least some of Diff1 in both rows in set 402) to generate Stacked Diff1 and generate Stacked Diff2 412 by combining at least a portion of the third and fourth difference images (i.e., at least some of Diff2 in both rows in set 406) to generate Stacked Diff2. Generating Stacked Diff1 may be performed using all of Diff1 generated by A1-CR(B1, B2), A2-CR(B1, B2), and generating Stacked Diff2 may be performed using all of Diff2 generated by A1-CR(C1, C2), A2-CR(C1, C2). In other words, Stacked Diff1 410 may be generated from all of Diff1 in set 402, and Stacked Diff2 412 may be generated from all of Diff2 in set 406. Therefore, in this approach, each of the stacked difference images is generated from difference images generated with across-row generated CR. In other words, the stacked difference images are generated from images from more than one row on the wafer. This multiple row sourcing of images to generate a single stacked difference image has multiple advantages described further herein.

Although it may be advantageous to use as many difference images as possible (i.e., all of them) to generate a stacked difference image, fewer than all of the difference images may be used to generate a stacked difference image when appropriate (e.g., when one or more of the difference images clearly contain some outlying characteristics). Combining at least a portion of multiple difference images to generate these and any other stacked difference images described herein may otherwise be performed in any suitable manner known in the art. For example, any suitable mathematical operation such as a linear combination may be used to combine multiple difference images into a stacked difference image.

The computer subsystem is also configured for detecting defect candidates in the multiple instances of the first patterned areas on the wafer by applying a defect detection method to the different stacked difference images. The defect detection method determines that a defect candidate is present at a location in each of the multiple instances of the first patterned areas only when the defect detection method detects the defect candidate at the location in the different stacked difference images. For example, the computer subsystem may be configured to perform double detection 414 using Stacked Diff1 410 and Stacked Diff2 412. Double detection means that a test image is compared to two different references to generate two different difference images, defect detection is performed on both difference images, and then arbitration is performed so that only defects detected at the same location by both defect detections are reported in the defect detection results.

In the embodiments described herein, the two different difference images are already generated before double detection step 414. Therefore, in step 414, each of the stacked difference images may be separately compared to some defect detection threshold. Any signals or pixels in each of the stacked difference images having a value above the threshold may be determined to be a defect candidate (conversely, signals or pixels having a value less than the threshold may not be identified as potential defects). Double detection may then compare the defect candidates detected in both stacked difference images and report a defect candidate only when a defect was detected at the same location in both stacked difference images. Obviously, this is perhaps the most simple method that can be used for the double detection step, and more complex or sophisticated methods may be used. The stacked difference images generated in one of the novel ways described herein can be input and used for defect detection in the same manner as any other difference images known in the art. In other words, the novel stacked difference images described herein are not particular to any kind of double detection.

The output of the double detection step may be defect detection results 416, in which a location of any defect candidate detected by double detection is identified in each of the patterned areas with some sort of indicia (in this case an asterisk). In this manner, the output of the double detection step is a full correlation for the defect candidates reported, with no individual frame information. In other words, because double detection is performed on the stacked difference images, the computer subsystem cannot determine whether each individual test image contains a defect candidate based on only the results of the detection step. So when the computer subsystem detects a defect candidate at a location via double detection, the computer subsystem will assign a defect candidate at the corresponding location (or flag the location or something equivalent) in each of the test images. Additional steps described herein may then be performed to determine if a defect is detected at the location of a defect candidate in each of the test image locations.

Although FIG. 4 (and other figures described herein) show that only one defect candidate is detected by the double detection step, obviously more than one defect candidate may be detected by the double detection step. In this case, results 416 may contain some indicia for each of the detected defect candidates in each of the test images. Each of the detected defect candidates may then be individually or separately evaluated to determine which of the test images actually contain a defect at the location of a detected defect candidate. In addition, although the results of the double detection step are shown in FIG. 4 (and other figures described herein) graphically, the results of the double detection step may be reported in any suitable file and format known in the art.

As described further above, therefore, the Type1 approach uses images generated from different reticle rows on a wafer in new and important ways. For example, the embodiments described above perform reference image generation using images from different reticle rows on the wafer (e.g., CR(B1, B2)). In addition, the embodiments described above perform difference image stacking by stacking difference images across 2 reticle rows (e.g., generating Stacked Diff1 from Diff1 images generated from A1 images and Diff1 images generated from A2 images). In addition, the double detection is performed based on comparisons between the test patterned areas and two other patterned areas in the reticle rows (e.g., A-B and A-C).

The Type1 approach described above has significant advantages for nuisance reduction. For example, Type1 described above will advantageously start with a lower number of repeater types than the currently used methods for MDR RDD. In particular, nuisance repeater types that may be detected by currently used methods for MDR RDD that do not have a signal in more than one row will be suppressed by the Type1 approach described above. When fewer repeater types are detected, there are less nuisance repeaters to be filtered. In addition, for some use cases, Type1 may have the highest noise reduction power and best raw sensitivity of all the different types described herein. Therefore, this embodiment may be most useful for situations in which maximum sensitivity is the highest priority.

The same Type1 approach described above for detecting defect candidates in A1 and A2 images may also or alternatively be used for detecting defect candidates in B1 and B2 images (and/or C1 and C2 images). For example, for detecting defect candidates in B1 and B2 images, difference image generation step 404 may be performed as described above except with B1-CR(A1, A2), B2-CR(A1, A2), and difference image generation step 408 may be performed as described above except with B1-CR(C1, C2), B2-CR(C1, C2). In a similar manner, for detecting defect candidates in C1 and C2 images, difference image generation step 404 may be performed as described above except with C1-CR (A1, A2), C2-CR(A1, A2), and difference image generation step 408 may be performed as described above except with C1-CR(B1, B2), C2-CR(B1, B2). The CRs for each of these defect detections may be generated as described above using the appropriate images. Each of the other approaches described herein may also be used in a similar manner to detect defects in the B1 and B2 images (and/or C1 and C2 images) instead of or in addition to being used to detect defects in the A1 and A2 images.

The Type1 approach described above may also be modified if the reticle includes more than three dies in a single row. For example, for detection of defects in any one of the dies, any two of the other dies are used (for detection of defects in the A1 and A2 images, images from B1, B2, C1, and C2 are used or images from C1, C2, D1, and D2 are used (not shown)). In another example, for detection of defects in any one of the dies, multiple detections may be performed using different combinations of the dies (for detection of defects in the A1 and A2 images, a first detection may be performed using images from B1, B2, C1, and C2 and a second detection may be performed using images from C1, C2, D1, and D2 (not shown)). In such instances, both of the first and second detections may be performed using double detection as described above with a further double detection in which a defect candidate is identified at a location in the A1 and A2 images only if both double detections detect a defect candidate at the location. Each of the other approaches described herein may be modified in a similar manner.

Figure 5:
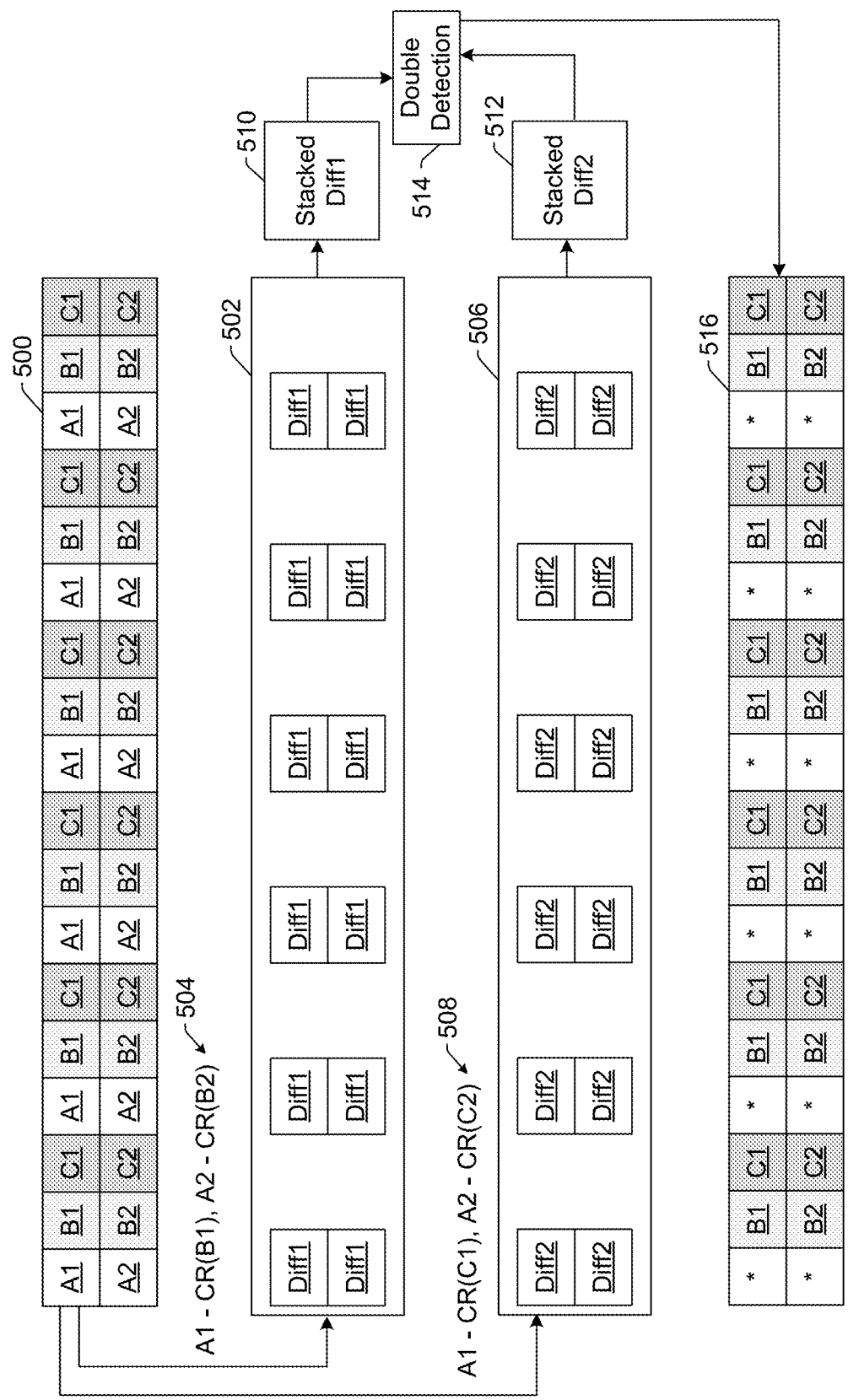

The second approach ("Type2") shown in FIG. 5 uses reference images from the same row as the test image to create CR images for each test image and stacks the resultant difference images across 2 rows. In this embodiment, test images 500 are generated for A1, A2, B1, B2, C1 and C2 by scanning two different rows on the wafer (not shown in FIG. 5). In one embodiment, generating Stacked Diff1 includes generating first and second difference images. In one such embodiment, generating the first difference images includes separately subtracting a first CR from the images generated for the multiple instances of the first patterned areas in a first of the different rows on the wafer and generating the second difference images includes separately subtracting a second CR from the images generated for the multiple instances of the first patterned areas in a second of the different rows on the wafer. For example, in FIG. 5, generating the first difference images (e.g., the top row of set 502 of Diff1) includes separately subtracting a first CR from the images generated for A1 and generating the second difference images (e.g., the bottom row of set 502) includes separately subtracting a second CR from the images generated for A2, as shown in step 504.

In some embodiments, the computer subsystem is configured for generating the first CR from the images of multiple instances of a second of the patterned areas in the first of the different rows on the wafer and generating the second CR from the images of multiple instances of the second of the patterned areas in the second of the different rows on the wafer. For example, as shown in FIG. 5, the first CR subtracted from A1 in step 504 may be generated as CR(B1), and the second CR subtracted from A2 in step 504 may be generated as CR(B2). In one embodiment, CR(B1) indicates that the CR is computed from the images generated by scanning every instance of B1 in row 1. However, CR(B1) may be generated from fewer than all of the images of the B1 patterned areas scanned in row 1. For example, a suitable CR may in some instances be generated from two B1 images, but as the number of reference images used to generate the CR increases, the quality of the CR will generally increase. Therefore, it may be desirable but not necessary to use all of the available reference images to generate a CR. The same can be said for all of the other CRs described herein.

In one embodiment, generating Stacked Diff2 includes generating third and fourth difference images. In an additional embodiment, generating the third difference images includes separately subtracting a third CR from the multiple instances of the images generated for the first patterned areas in the first of the different rows on the wafer and generating the fourth difference images include separately subtracting a fourth CR from the images generated for the multiple instances of the first patterned areas in the second of the different rows on the wafer. For example, in FIG. 5, generating the third difference images in step 508 (e.g., the top row of set 506 of Diff2) includes separately subtracting a third CR from the images generated for A1 and generating the fourth difference images (e.g., the bottom row of set 506) includes separately subtracting a fourth CR from the images generated for A2, as shown in step 508.

In another embodiment, the computer subsystem is configured for generating the third CR from the images of multiple instances of a third of the patterned areas in the first of the different rows on the wafer and generating the fourth CR from the images of multiple instances of the third of the patterned areas in the second of the different rows on the wafer. For example, as shown in FIG. 5, the third CR subtracted from A1 in step 508 may be generated as CR(C1), and the fourth CR subtracted from A2 in step 508 may be generated as CR(C2).

As shown in FIG. 5, the computer subsystem may generate Stacked Diff1 510 by combining at least a portion of the first and second difference images (i.e., at least some of Diff1 in both rows in set 502) to generate Stacked Diff1 and generate Stacked Diff2 512 by combining at least a portion of the third and fourth difference images (i.e., at least some of Diff2 in both rows in set 506) to generate Stacked Diff2.

The computer subsystem is also configured for detecting defect candidates in the multiple instances of the first patterned areas on the wafer by applying a defect detection method to the different stacked difference images. The defect detection method determines that a defect candidate is present at a location in each of the multiple instances of the first patterned areas only when the defect detection method detects the defect candidate at the location in the different stacked difference images. For example, the computer subsystem may be configured to perform double detection 514 using stacked Diff1 510 and Stacked Diff2 512. Double detection 514 may be performed as described further herein. The output of the double detection step may be defect detection results 516, in which a location of any defect candidate detected by double detection is identified in each of the patterned areas with some sort of indicia (in this case an asterisk). In this manner, the output of the double detection step is a full correlation for the defects reported, with no individual frame information. Results 516 may be further configured as described herein.

The Type2 approach, therefore, also uses images generated from different reticle rows on a wafer in new and important ways. For example, although the embodiments described above perform reference image generation using images from the same reticle rows on the wafer as the test images (e.g., CR(B1) for A1 and CR(B2) for A2), the embodiments perform difference image stacking by stacking difference images across 2 reticle rows (e.g., generating Stacked Diff1 from Diff1 images generated from A1 images and Diff1 images generated from A2 images). In addition, the double detection is performed based on comparisons between the test patterned areas and two other patterned areas in the reticle rows (e.g., A-B and A-C).

The Type2 approach has significant advantages for noise reduction. For example, the Type2 approach will have more noise reduction power than currently used systems and methods for MDR RDD.

Figure 6:
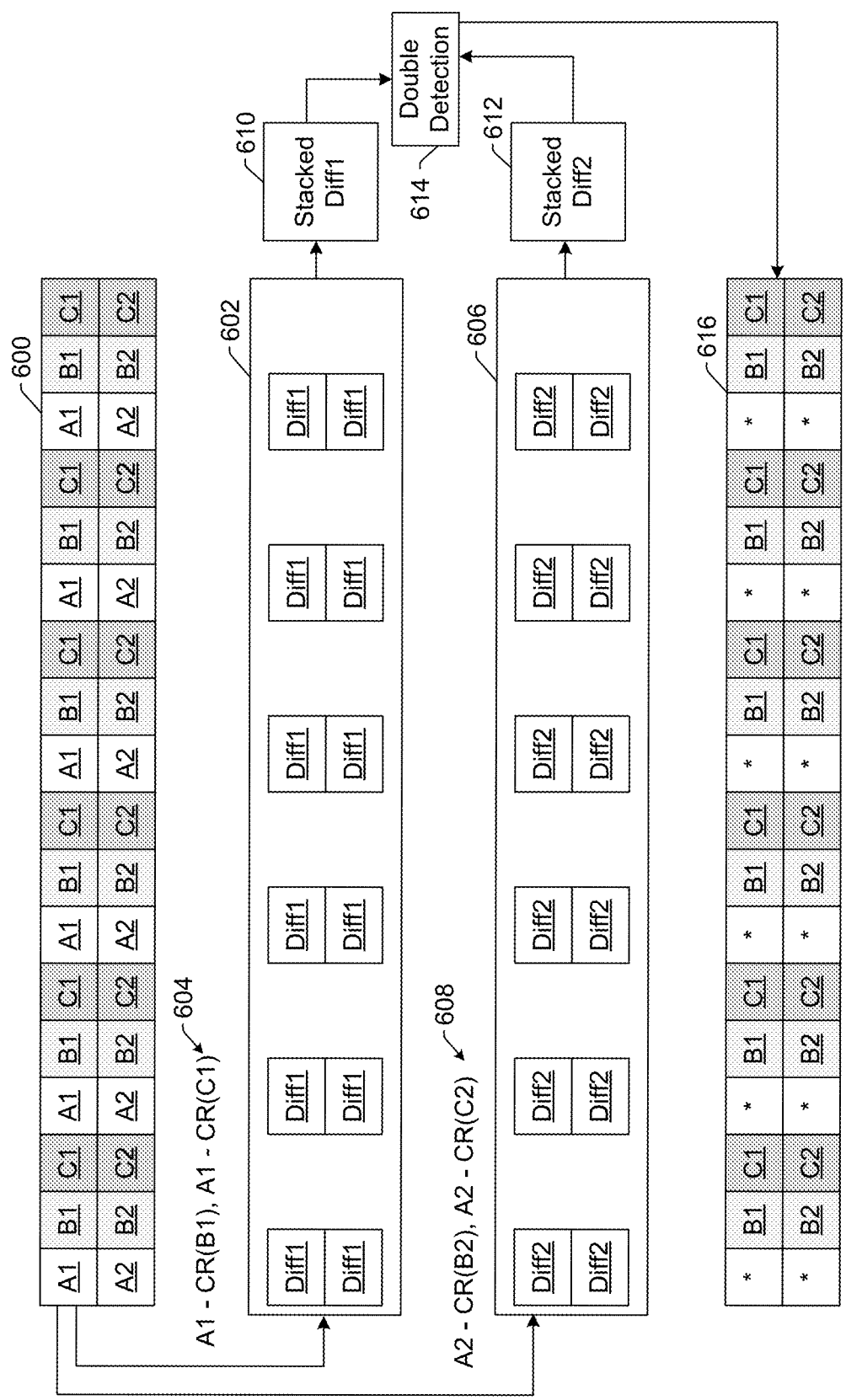

The third approach ("Type3") shown in FIG. 6 uses reference images from the same row as the test image to create CR images for each test image and stacks the resultant difference images in the same row. In this embodiment, test images 600 may be generated for A1, A2, B1, B2, C1 and C2 by scanning two different rows on the wafer (not shown in FIG. 6). In one embodiment, generating Stacked Diff1 includes generating first and second difference images. In some such embodiments, generating the first difference images includes separately subtracting a first CR from the images generated for the multiple instances of the first patterned areas in a first of the different rows on the wafer and generating the second difference images includes separately subtracting a second CR from the images generated for the multiple instances of the first patterned areas in the first of the different rows on the wafer. For example, in FIG. 6, generating the first difference images (e.g., the top row of set 602 of Diff1) includes separately subtracting a first CR from the images generated for A1 and generating the second difference images (e.g., the bottom row of set 602) includes separately subtracting a second CR from the images generated for A1, as shown in step 604.

In another such embodiment, the computer subsystem is configured for generating the first CR from the images of multiple instances of a second of the patterned areas in the first of the different rows on the wafer and generating the second CR from the images of multiple instances of a third of the patterned areas in the first of the different rows on the wafer. For example, as shown in FIG. 6, the first CR subtracted from A1 in step 604 may be generated as CR(B1), and the second CR subtracted from A1 in step 604 may be generated as CR(C1).

In one embodiment, generating Stacked Diff2 includes generating third and fourth difference images. In additional embodiments, generating the third difference images includes separately subtracting a third CR from the images generated for the multiple instances of the first patterned areas in a second of the different rows on the wafer and generating the fourth difference images includes separately subtracting a fourth CR from the images generated for the multiple instances of the first patterned areas in the second of the different rows on the wafer. For example, in FIG. 6, generating the third difference images (e.g., the top row of set 606 of Diff2) includes separately subtracting a third CR from the images generated for A2 and generating the fourth difference images (e.g., the bottom row of set 606) includes separately subtracting a fourth CR from the images generated for A2, as shown in step 608.

In a further embodiment, the computer subsystem is configured for generating the third CR from the images of multiple instances of a second of the patterned areas in the second of the different rows on the wafer and generating the fourth CR from the images of multiple instances of a third of the patterned areas in the second of the different rows on the wafer. For example, as shown in FIG. 6, the third CR subtracted from A2 in step 608 may be generated as CR(B2), and the fourth CR subtracted from A2 in step 608 may be generated as CR(C2).

As shown in FIG. 6, the computer subsystem may generate Stacked Diff1 610 by combining at least a portion of the first and second difference images (i.e., at least some of Diff1 in both rows in set 602) to generate Stacked Diff1 and generate Stacked Diff2 612 by combining at least a portion of the third and fourth difference images (i.e., at least some of Diff2 in both rows in set 606) to generate Stacked Diff2.

The computer subsystem is also configured for detecting defect candidates in the multiple instances of the first patterned areas on the wafer by applying a defect detection method to the different stacked difference images. The defect detection method determines that a defect candidate is present at a location in each of the multiple instances of the first patterned areas only when the defect detection method detects the defect candidate at the location in the different stacked difference images. For example, the computer subsystem may be configured to perform double detection 614 using stacked Diff1 610 and Stacked Diff2 612, which may be performed as described further herein. The output of the double detection step may be defect detection results 616, in which a location of any defect candidate detected by double detection is identified in each of the patterned areas with some sort of indicia (in this case an asterisk). In this manner, the output of the double detection step is a full correlation for the defects reported, with no individual frame information. Results 616 may be further configured as described herein.

The Type3 approach, therefore, uses images generated from different reticle rows on a wafer in new and important ways. For example, although the embodiments described above perform reference image generation using images from the same reticle rows on the wafer as the test images (e.g., CR(B1) for A1 and CR(B2) for A2) and the embodiments described above perform difference image stacking by stacking difference images in 1 reticle row (e.g., generating Stacked Diff1 from Diff1 images generated from only row 1 images and not row 2 images), the double detection is performed across row (i.e., one detection performed for 1 row and another detection performed for another row).

Figure 7:
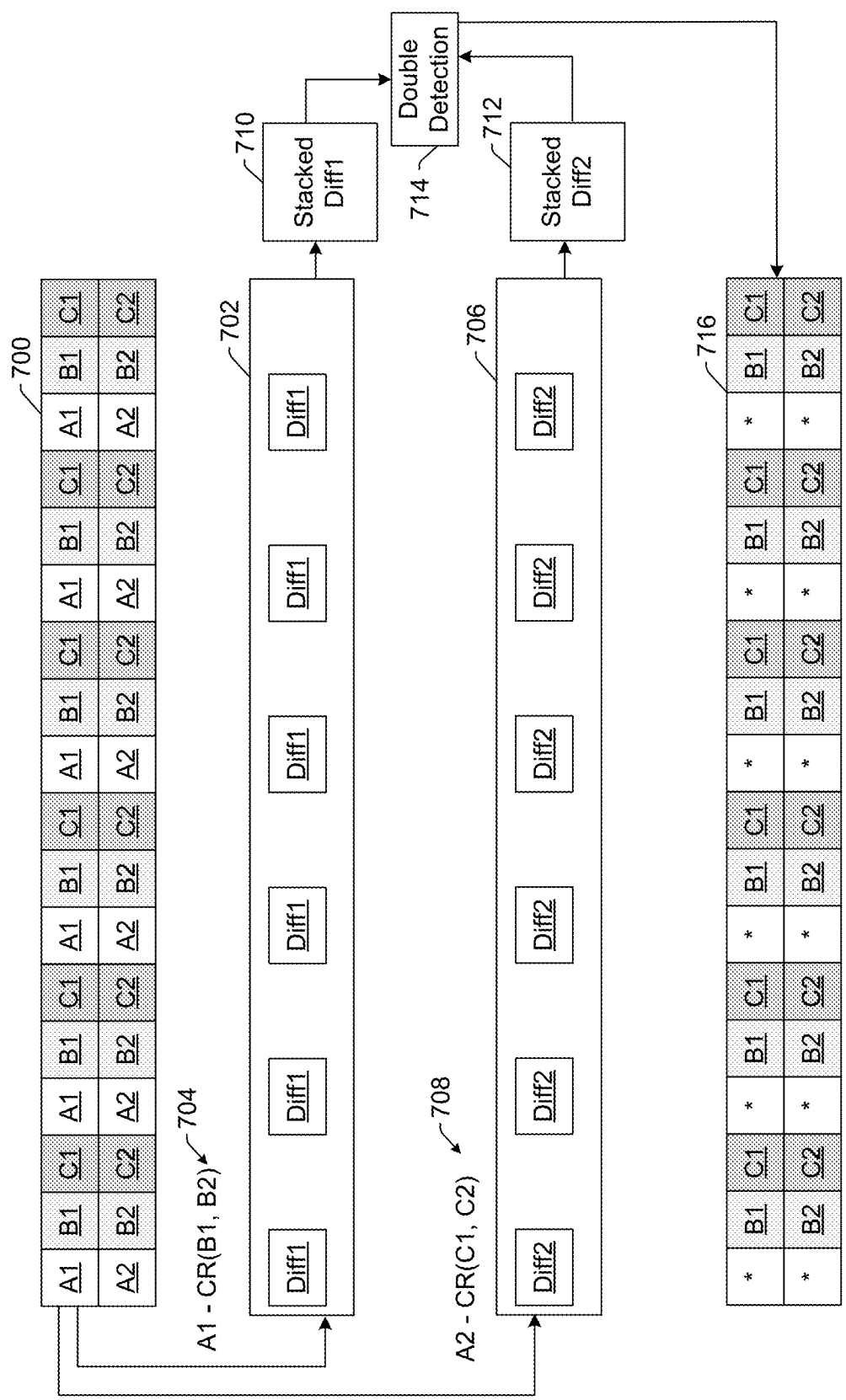

The fourth approach ("Type 4") shown in FIG. 7 uses reference images from two rows to create CR images for each test image and stacks the resultant difference images in the same row. In this embodiment, test images 700 may be generated for A1, A2, B1, B2, C1 and C2 by scanning two different rows on the wafer (not shown in FIG. 7). In this embodiment, generating Stacked Diff1 includes generating first difference images, Diff1, and combining at least a portion of Diff1 to generate Stacked Diff1, and generating Stacked Diff2 includes generating second difference images, Diff2, and combining at least a portion of Diff2 to generate Stacked Diff2.

In one such embodiment, generating Diff1 includes separately subtracting a first CR from the images generated for the multiple instances of the first patterned areas in a first of the different rows on the wafer. For example, in FIG. 7, generating Diff1 (e.g., set 702 of Diff1) includes separately subtracting a first CR from the images generated for A1, as shown in step 704. In another embodiment, the computer subsystem is configured for generating the first CR from the images of multiple instances of a second of the patterned areas in the first and a second of the different rows on the wafer. For example, as shown in FIG. 7, the first CR subtracted from A1 in step 704 may be generated as CR(B1, B2).

In a further embodiment, generating Diff2 images includes separately subtracting a second CR from the images generated for the multiple instances of the first patterned areas in a second of the different rows on the wafer. For example, in FIG. 7, generating Diff2 (e.g., set 706 of Diff2) includes separately subtracting a second CR from the images generated for A2, as shown in step 708. In some such embodiments, the computer subsystem is configured for generating the second CR from the images of multiple instances of a third of the patterned areas in the first and second of the different rows on the wafer. For example, as shown in FIG. 7, the second CR subtracted from A2 in step 708 may be generated as CR(C1, C2).

As shown in FIG. 7, the computer subsystem may generate Stacked Diff1 710 by combining at least a portion of Diff1 (i.e., at least some of Diff1 in set 702) to generate Stacked Diff1 and generate Stacked Diff2 712 by combining at least a portion of Diff2 (i.e., at least some of Diff2 in set 706) to generate Stacked Diff2.

The computer subsystem is also configured for detecting defect candidates in the multiple instances of the first patterned areas on the wafer by applying a defect detection method to the different stacked difference images. The defect detection method determines that a defect candidate is present at a location in each of the multiple instances of the first patterned areas only when the defect detection method detects the defect candidate at the location in the different stacked difference images. For example, the computer subsystem may be configured to perform double detection 714 using stacked Diff1 710 and Stacked Diff2 712. Double detection 714 may be performed as described further herein. The output of the double detection step may be defect detection results 716, in which a location of any defect candidate detected by double detection is identified in each of the patterned areas with some sort of indicia (in this case an asterisk). In this manner, the output of the double detection step is a full correlation for the defects reported, with no individual frame information. Results 716 may be further configured as described herein.

The Type4 approach, therefore, uses images generated from different reticle rows on a wafer in new and important ways. For example, the Type4 approach performs reference image generation using images from different reticle rows on the wafer (e.g., CR(B1, B2)). In addition, although the Type4 approach performs difference image stacking by stacking difference images in 1 reticle row (e.g., generating Stacked Diff1 from Diff1 images generated from only row 1 images and not row 2 images), the double detection is performed across row (i.e., one detection performed for A1 images in row 1 and another detection performed for A2 images in row 2).

The Type4 approach has significant advantages over other methods and systems currently used and described herein. For example, the Type4 approach will advantageously start with a lower total number of repeater types than other types described herein. In addition, nuisance repeater types that may be detected by currently used methods for MDR RDD that do not have a signal in more than one row will be suppressed. The Type4 approach may therefore have the highest nuisance suppression power of the embodiments described herein and better sensitivity than currently used methods and systems for RDD. The Type4 approach may therefore be particularly useful for situations in which the defect review budget is relatively limited.

The computer subsystem is further configured for identifying defects on the reticle based on the detected defect candidates. As described further herein, when a defect candidate is detected by double detection, a defect candidate is initially identified in each of the test images for which the double detection was performed. However, a defect may not actually be located at the defect candidate location in each test image. The computer subsystem may perform a step or steps to first determine if a defect is located at the defect candidate location in each test image and to then determine if the defect sufficiently repeats in multiple instances of a patterned area to be considered a reticle defect. These steps may be performed as described further herein based at least partially on some local characteristic of the test images at the locations of the detected defect candidates.

In some embodiments, identifying the defects on the reticle includes determining a local image characteristic at the location in each of the images of the multiple instances of the first patterned areas, comparing the determined local image characteristic at the location in each of the images of the multiple instances of the first patterned areas to a threshold, determining a number of the images of the multiple instances of the first patterned areas having the determined local image characteristic above the threshold, and comparing the determined number to a repeater threshold. For example, the defect detection results generated by any of Types 1-4 described above may be input to the identifying step as results 800 shown in FIG. 8.

Figure 8:
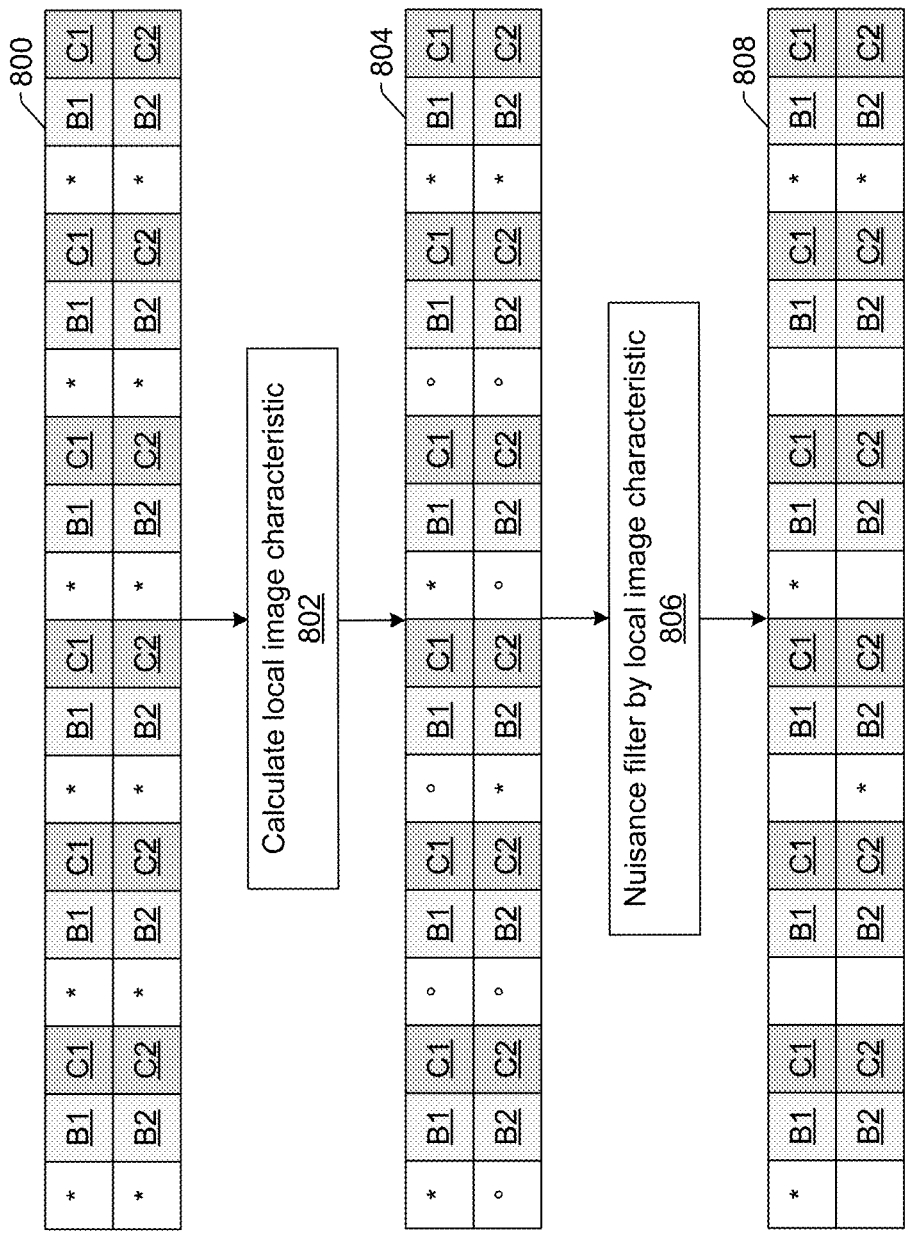
FIG. 8 is a flow chart illustrating an embodiment of identifying defects on a reticle based on defect candidates detected on a wafer.

The computer subsystem may then calculate a local image characteristic, as shown in step 802 of FIG. 8. For example, the computer subsystem may calculate a local signal-to-noise ratio (SNR) for each defect candidate location in results 800. More specifically, the computer subsystem may calculate a local SNR for each defect candidate location in each A1 and A2 test image. Although some embodiments may be described herein with respect to a local SNR, the embodiments may use any other suitable local image characteristic or metric for this step including, but not limited to, magnitude, spot likeness, local salience, energy parameter, repeater signal, etc. Any of these local image characteristics may be determined in any suitable manner known in the art.

The computer subsystem may compare the determined local image characteristic at the location in each of the images of the multiple instances of A1 and A2 to a threshold (essentially a defect detection threshold). The results of this step may be results 804 in which an asterisk indicates that the defect candidate location in a test image has a local image characteristic above the threshold, and a degree symbol indicates that the defect candidate location in a test image has the local image characteristic below the threshold.

The computer subsystem may perform nuisance filtering by local image characteristic, as shown in step 806, thereby producing defect detection results 808. In one such example, nuisance filtering may include eliminating any defect candidates having a local SNR below the threshold (i.e., all the defect candidates whose location is shown with a degree symbol in results 804) and retaining any defect candidates having a local SNR above the threshold (i.e., all the defect candidates whose location is shown with an asterisk in results 804). In this manner, results 808, the output of the nuisance filtering step, is a partial correlation for the defects reported. What a partial correlation for the defects reported means in this context is that the local SNR test does not need to pass on every test image for a defect to be reported. At least some of the test images have to pass the local SNR test to be considered a repeater defect, and how may of the test images have to pass to be considered a repeater defect is controlled by the repeater threshold. The repeater threshold may be set in advance by a user or in another suitable manner and may vary depending on a number of variables such as the level of process variation expected across the wafer, which may cause a defect to repeat in fewer than all of the test images and/or may cause noise in the test images that can be erroneously detected as defects. Therefore, even if a defect does not repeat at every instance of a test image, under the right circumstances, it may be appropriate to consider it a repeater defect.

The final repeater defect candidates (i.e., defects that repeat in numbers greater than the repeater threshold) may all be identified as defects on the reticle. However, identifying the defects on the reticle based on the final repeater defect candidates may optionally include some additional analysis. For example, the repeaters may be input to any suitable post-processing known in the art such as defect classification (e.g., via any suitable defect classification method or algorithm). Repeater analysis may also include sampling defects for review, which may be performed on a subset of all of the final repeater defect candidates to verify and/or classify the sampled defects. Such review sampling may generate review samples that include information for the selected subset of the final repeater defect candidates, which can then be sent to a defect review tool (not shown) that performs the defect review.

In general, the embodiments described herein are configured for detecting reticle repeater defects, but some of the reticle repeater defects may actually be die repeater defects. For the purpose of the applications described herein, the user may want to keep only reticle repeaters. If this is the case, die repeaters for MDR should be removed from the final report. In particular, the embodiments described herein may be used for applications in which the user is looking for the repeater defects that are produced due to problems with the reticle (photomask). In that case, defects that are present at the same location in different dies on the same reticle are, most likely, caused by wafer processing—not by the reticle itself.

In other words, defects that appear on the wafer at substantially the same location in multiple dies of a single reticle are likely not due to actual reticle defects such as a damaged patterned feature, a particle or foreign matter, and the like. Instead, if a defect repeats on a wafer in multiple dies on a reticle, the defects on the wafer that repeat in the dies are likely due to an interaction issue between the reticle, wafer, and process (e.g., a marginal design that is failing due to a design/process interaction issue). Such die repeater defects may be interesting in some use cases, and the embodiments described herein may be used for such cases. However, the embodiments described herein can also be used specifically for detecting defects that repeat from printed reticle instance to printed reticle instance and can therefore be assumed to be caused by reticle defects.

In some instances, the defects will not be reported in reticle coordinates by the computer subsystem. In other words, when the computer subsystem detects a defect, the coordinates of the location of that defect may not be determined by the computer subsystem with respect to a reticle. In this manner, the coordinates of the defects determined by the computer subsystem may be translated into reticle coordinates by the computer subsystem or another system or method. The coordinates may be translated in a number of different ways. For example, one relatively straightforward way is to translate the coordinates reported for the defects to a reference that is common to the wafer and the reticle such as a design for the wafer and the reticle. In one such example, the images generated for the defects by the inspection subsystem can be aligned to the design for the wafer. Once the design coordinates of the defects are determined, those coordinates can be translated to reticle coordinates based on the known relationship between the design and the reticle.

The computer subsystem may preferably store information for all of the detected defects such that the information for all of the detected defects is available for RDD and any other functions. Once RDD is performed by the computer subsystem, the information that was stored for defects determined to not be reticle and/or die repeaters may be eliminated from the stored information prior to sending that information to another computer subsystem, another method, back to storage, etc.

The computer subsystem may be configured for storing results of any one or more steps described herein in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, the defects detected on the reticle may be used to control and/or alter a reticle repair or cleaning process in which the goal is to remove or repair one or more reticle defects to thereby prevent such reticle defects from being printed on other wafers. In one such example, information for the defects detected on the reticle may be used by the computer subsystem described herein, another system (e.g., a reticle repair system (not shown), which may or may not be part of or coupled to the system embodiments described herein), or another method (e.g., a reticle repair method) to determine where on a reticle a repair or cleaning process should be performed. The information for the defects detected on the reticle may also be used to determine one or more parameters of such a process such as the area on which the process is to be performed, the length of time that the process is to be performed, which chemicals or gases should be used in the process, etc. In this manner, the altered reticle can be used to print other wafers in the lithography process. The altered reticle may also be re-inspected using the embodiments described herein at another time after it has been re-introduced to the lithography process.

Although using a 2-row sample plan as described in Types1-4 above is particularly useful for the embodiments described herein (e.g., to minimize system memory requirements and to reduce nuisance correlations), more than two rows may be sampled and processed collectively for detecting defects on a reticle. FIG. 9 shows test images 900 generated in 3 rows on a wafer (not shown in FIG. 9) that may be processed collectively for reticle defect detection. In this and other embodiments described herein, A1, A2, and A3 refer to patterned areas printed on a wafer with a reticle in a lithography process that correspond to the same area on the reticle and printed in different rows on the wafer. Similarly, B1, B2, and B3 (and C1, C2, and C3) refer to patterned areas printed on the wafer with the reticle in the lithography process that correspond to the same area on the reticle and printed in different rows on the wafer. In this manner, A1, A2, and A3 may be the same portion of a die printed on a wafer with an MDR, B1, B2, and B3 may be the same portion of a different die printed on the wafer with the MDR, and C1, C2, and C3 may be the same portion of another different die printed on the wafer with the MDR. Test images 900 may be generated for A1, A2, A3, B1, B2, B3, C1, C2, and C3 by scanning three different rows on the wafer. For example, in S1 shown in FIG. 3, test images for A1, B1, and C1 may be generated, and each set of A1, B1, and C1 may be generated for a single MDR instance printed on the wafer. In S3 in FIG. 3, test images for A2, B2, and C2 may be generated, and each set of A2, B2, and C2 may be generated for a single MDR instance printed on the wafer. In S5 shown in FIG. 3, test images for A3, B3, and C3 may be generated, and each set of A3, B3, and C3 may be generated for a single MDR instance printed on the wafer.

If the only goal is to achieve maximum noise reduction, the approach should be stacking difference images across all three reticle rows in the inspection sample plan, but this kind of approach would have substantially limited nuisance suppression power. For example, only one set of stacked difference images may be generated with a 3 row stacking approach thereby making nuisance suppression more challenging. Instead, the embodiments described herein may be configured for inspecting every two reticle rows by stacking the difference images. This may be performed using any of the approaches described herein but is shown in FIGS. 4 and 10 using Type1 as an example.

In one embodiment, the computer subsystem is configured for performing the generating and detecting for a first and a second of the different rows on the wafer, separately performing the generating and detecting for the second and a third of the different rows on the wafer, and inputting the results of both of the detecting steps into the identifying step. In this manner, two sets of stacked difference images are generated independently across 3 reticle rows with a 2 row stacking approach. The method shown in FIG. 4 is performed for rows 1 and 2 while the method shown in FIG. 10 is performed for rows 2 and 3. In this manner, row 2 is common to both FIGS. 4 and 10. In other words, for a three reticle row sample plan, two rows at a time (row 1, row 2 and row 2, row 3) are inspected, with row 2 being redundant in both inspections.

Figure 10:
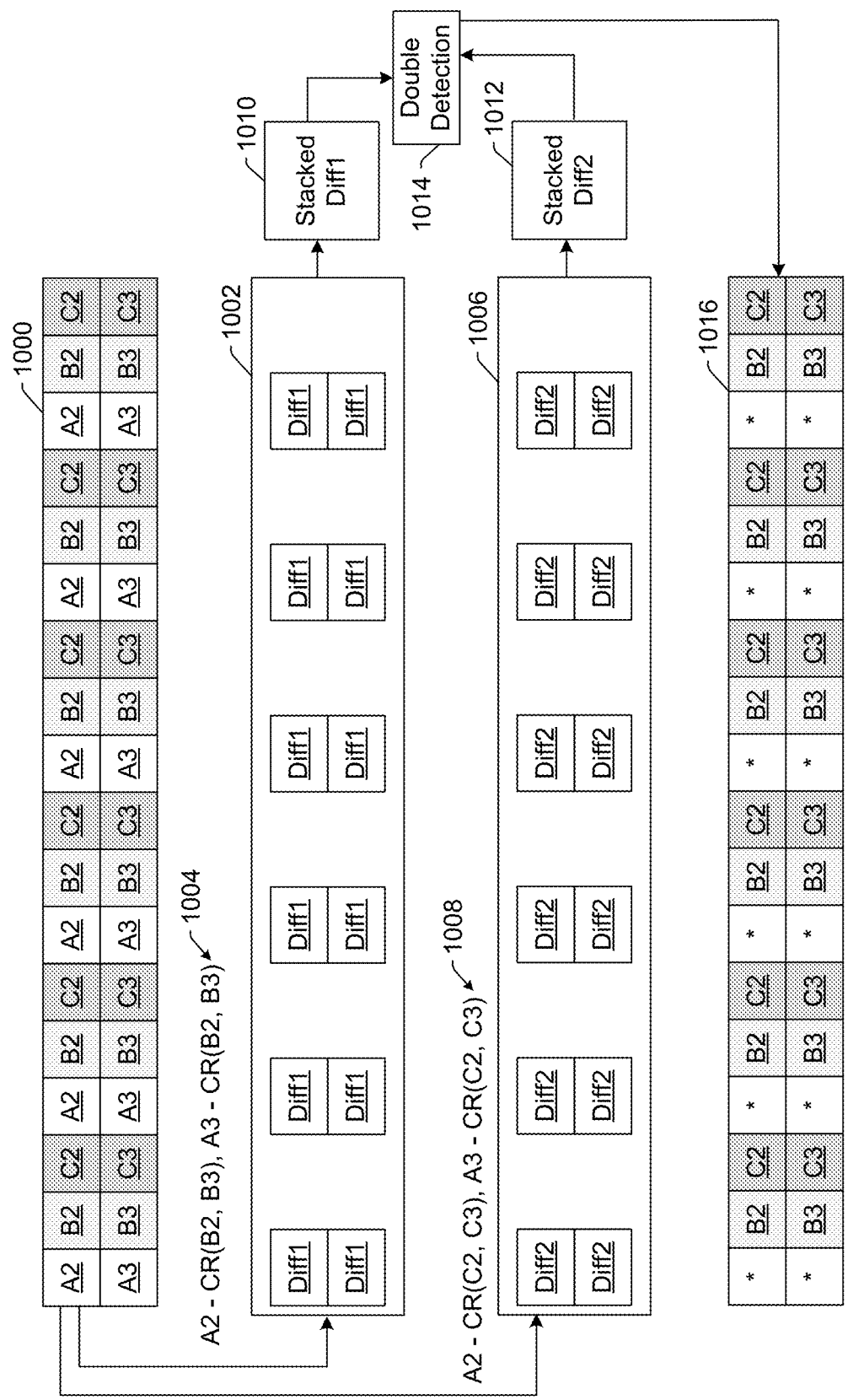
FIG. 10 is a flow chart illustrating an embodiment of the generating different stacked difference images and detecting defect candidates steps that may be performed for detecting defects on a reticle in combination with the steps shown in FIG. 4 when processing three rows of patterned areas collectively.

Like the first approach shown in FIG. 4, the separately performed, Type1 approach shown in FIG. 10 also uses reference images from 2 rows to create CR images for each test image and stacks the resultant difference images across 2 rows for maximum noise reduction. In one such embodiment, generating the first difference images includes separately subtracting a first CR from the images generated for the multiple instances of the first patterned areas in a first of the different rows on the wafer and generating the second difference images includes separately subtracting the first CR from the images generated for the multiple instances of the first patterned areas in a second of the different rows on the wafer. For example, in FIG. 10, generating the first difference images (e.g., the top row of set 1002 of Diff1) includes separately subtracting a first CR from the images generated for A2 and generating the second difference images (e.g., the bottom row of set 1002) includes separately subtracting the first CR from the images generated for A3, as shown in step 1004.

In some such embodiments, the computer subsystem is configured for generating the first CR from the images of multiple instances of a second of the patterned areas in the different rows on the wafer. For example, as shown in FIG. 10, the first CR subtracted from A2 in step 1004 may be generated as CR(B2, B3). This same CR may be separately subtracted from A3 as shown in step 1004.

In additional embodiments, generating the third difference images includes separately subtracting a second CR from the images generated for the multiple instances of the first patterned areas in the first of the different rows on the wafer and generating the fourth difference images includes separately subtracting the second CR from the images generated for the multiple instances of the first patterned areas in the second of the different rows on the wafer. For example, in FIG. 10, generating the third difference images (e.g., the top row of set 1006 of Diff2) includes separately subtracting a second CR from the images generated for A2 and generating the fourth difference images (e.g., the bottom row of set 1006) includes separately subtracting the second CR from the images generated for A3, as shown in step 1008.

In another embodiment, the computer subsystem is configured for generating the second CR from the images of multiple instances of a third of the patterned areas in the different rows on the wafer. For example, as shown in FIG. 10, the second CR subtracted from A2 in step 1008 may be generated as CR(C2, C3). This same CR may be separately subtracted from A3 as shown in step 1008.

As shown in FIG. 10, the computer subsystem may generate Stacked Diff1 1010 by combining at least a portion of the first and second difference images (i.e., at least some of Diff1 in both rows in set 1002) to generate Stacked Diff1 and generate Stacked Diff2 1012 by combining at least a portion of the third and fourth difference images (i.e., at least some of Diff2 in both rows in set 1006) to generate Stacked Diff2.

The computer subsystem is also configured for detecting defect candidates in the multiple instances of the first patterned areas on the wafer by applying a defect detection method to the different stacked difference images. The defect detection method determines that a defect candidate is present at a location in each of the multiple instances of the first patterned areas only when the defect detection method detects the defect candidate at the location in the different stacked difference images. For example, the computer subsystem may be configured to perform double detection 1014 using stacked Diff1 1010 and Stacked Diff2 1012. Double detection 1014 may be performed as described further herein. The output of the double detection step may be defect detection results 1016, in which a location of any defect candidate detected by double detection is identified in each of the patterned areas with some sort of indicia (in this case an asterisk). In this manner, the output of the double detection step is a full correlation for the defects reported, with no individual frame information. Results 1016 may be configured as described further herein.

The Type1, 3-row approach described above has significant advantages for nuisance reduction. For example, Type1 described above, regardless of the rows for which it is performed, will advantageously start with a lower number of repeater types than the currently used methods for MDR RDD. In particular, nuisance repeater types that may be detected by currently used methods for MDR RDD that do not have a signal in more than one row will be suppressed, regardless of the rows being inspected.

Figure 11:
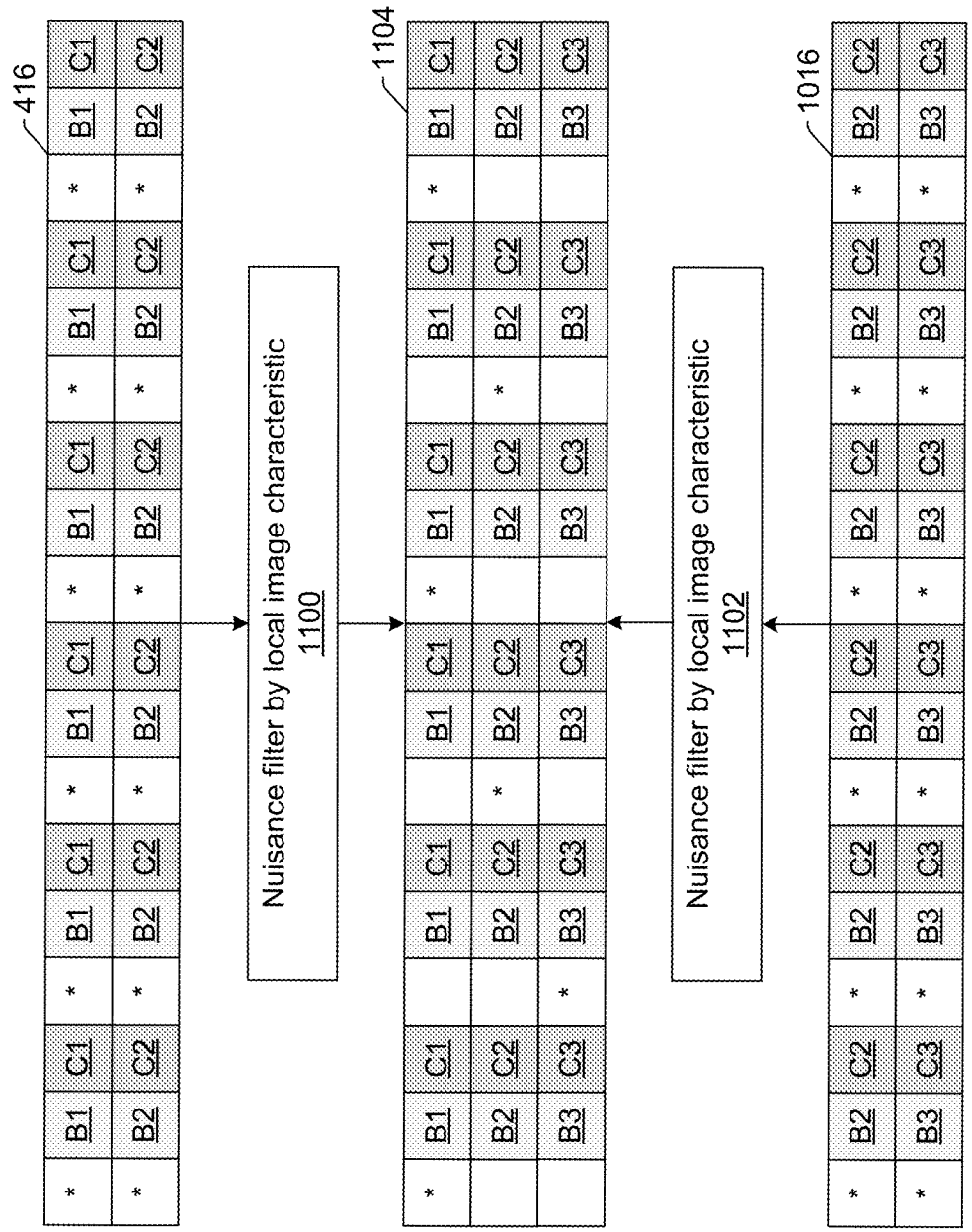
FIG. 11 is a flow chart illustrating an embodiment of identifying defects on a reticle based on defect candidates detected on a wafer that may be performed when processing three rows of patterned areas collectively.

One embodiment of inputting the results of both of the detecting steps into the identifying step is shown in FIG. 11. In this embodiment, defect detection results 416 produced by performing the Type1 approach for rows 1 and 2 are generated as shown in FIG. 4 and input to the identifying step with defect detection results 1016 produced by performing the Type1 approach for rows 2 and 3 as shown in FIG. 10. Nuisance filtering may be separately performed for each of the defect detection results. For example, nuisance filtering by local image characteristic may be performed in step 1100 for defect detection results 416, and nuisance filtering by local image characteristic may also be performed in step 1102 for defect detection results 1016. The defects may be nuisance filtered as described above by thresholding a local image characteristic thereby producing defect detection results 1104. In one such example, nuisance filtering may include eliminating any defect candidates having a local SNR below the threshold and retaining any defect candidates having a local SNR above the threshold. In this manner, results 1104, the output of the nuisance filtering steps, is a partial correlation for the defects reported.

The embodiments described above have, therefore, a number of advantages over currently used methods and systems for detecting defects on reticles. For example, mask repeater defects cause yield loss on every reticle printed if not detected. With shrinking design rules, repeater defect size that should not be missed is getting smaller. Signals for smaller repeater sizes also get weaker which requires ways to achieve better noise reduction and better nuisance suppression to minimize defect review load. The embodiments described herein provide solutions that meet different user use cases. Some users pursue maximum raw sensitivity to the smallest possible repeaters, while other users may prefer to limit the defect review budget by asking for the smallest total number of repeaters.

These and other advantages described herein are enabled by a number of important new features of the embodiments described herein. One such new feature is the use of reticle-based interleaved swathing to acquire swath images. Another new feature includes using an alignment die located in the first reticle row swathed to align other reticle rows. An additional new feature is using reference images across multiple reticle rows for CR image generation. A further new feature is stacking difference images across multiple reticle rows for maximum noise reduction. Yet another new feature is stacking difference images within the same row as test images and double detection across reticle rows for maximum nuisance suppression.

Each of the embodiments of the system described herein may be combined with any other embodiments of the system described herein.

Another embodiment relates to a computer-implemented method for detecting defects on a reticle. The method includes acquiring images generated for a wafer by an inspection subsystem. A reticle is used to print patterned areas on the wafer in a lithography process. The patterned areas include first patterned areas corresponding to the same area on the reticle and printed in different rows on the wafer. The method also includes the generating, detecting, and identifying steps described above, which are performed by a computer subsystem coupled to the inspection subsystem.

Each of the steps of the method may be performed as described further herein. The method may also include any other step(s) that can be performed by the inspection subsystem and/or computer subsystem described herein, which may be configured according to any of the embodiments described herein. In addition, the method described above may be performed by any of the system embodiments described herein.

Figure 12:
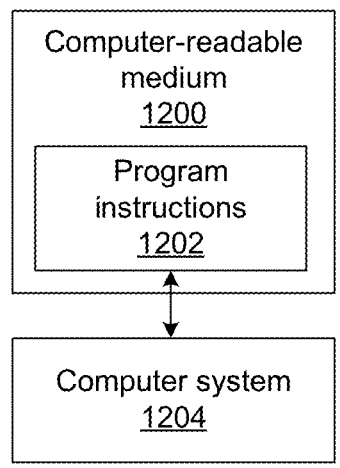
FIG. 12 is a block diagram illustrating one embodiment of a non-transitory computer-readable medium storing program instructions executed on a computer system for performing one or more of the computer-implemented methods described herein.

An additional embodiment relates to a non-transitory computer-readable medium storing program instructions executed on a computer system for performing a computer-implemented method for detecting defects on a reticle. One such embodiment is shown in FIG. 12. In particular, as shown in FIG. 12, non-transitory computer-readable medium 1200 includes program instructions 1202 executable on computer system 1204. The computer-implemented method may include any step(s) of any method(s) described herein.

Program instructions 1202 implementing methods such as those described herein may be stored on computer-readable medium 1200. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 1204 may be configured according to any of the embodiments described herein.

Further modifications and alternative embodiments of various aspects of the invention will be apparent to those skilled in the art in view of this description. For example, systems and methods for detecting defects on a reticle are provided. Accordingly, this description is to be construed as illustrative only and for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to detect defects on a reticle, comprising:
   an inspection subsystem configured to generate images for a wafer, wherein a reticle is used to print patterned areas on the wafer in a lithography process, and wherein the patterned areas comprise first patterned areas corresponding to the same area on the reticle and printed in different rows on the wafer; and
   a computer subsystem configured for:
      generating different stacked difference images for multiple instances of the first patterned areas in the different rows based on the images generated for the first patterned areas in the different rows by the inspection subsystem;
      detecting defect candidates in the multiple instances of the first patterned areas on the wafer by applying a defect detection method to the different stacked difference images, wherein the defect detection method determines that a defect candidate is present at a location in each of the multiple instances of the first patterned areas only when the defect detection method detects the defect candidate at the location in the different stacked difference images; and
      identifying defects on the reticle based on the detected defect candidates.

2. The system of claim 1, wherein the inspection subsystem is further configured to generate the images by interleaving scanning of the first patterned areas in the different rows on the wafer with scanning of a second of the patterned areas in the different rows on the wafer.

3. The system of claim 2, wherein the first patterned areas and the second of the patterned areas correspond to different portions of a die on the reticle.

4. The system of claim 2, wherein the first patterned areas and the second of the patterned areas correspond to different instances of a die on the reticle printed on the wafer.

5. The system of claim 1, wherein the reticle is a multi-die reticle, and wherein the first patterned areas comprise at least a portion of only a first die of the multi-die reticle printed on the wafer.

6. The system of claim 1, wherein generating a first of the different stacked difference images comprises generating first and second difference images and combining at least a portion of the first and second difference images to generate the first of the different stacked difference images, and wherein generating a second of the different stacked difference images comprises generating third and fourth difference images and combining at least a portion of the third and fourth difference images to generate the second of the different stacked difference images.

7. The system of claim 6, wherein generating the first difference images comprises separately subtracting a first computed reference from the images generated for the multiple instances of the first patterned areas in a first of the different rows on the wafer and generating the second difference images comprises separately subtracting the first computed reference from the images generated for the multiple instances of the first patterned areas in a second of the different rows on the wafer.

8. The system of claim 7, wherein the computer subsystem is further configured for generating the first computed reference from the images of multiple instances of a second of the patterned areas in the different rows on the wafer.

9. The system of claim 7, wherein generating the third difference images comprises separately subtracting a second computed reference from the images generated for the multiple instances of the first patterned areas in the first of the different rows on the wafer and generating the fourth difference images comprises separately subtracting the second computed reference from the images generated for the multiple instances of the first patterned areas in the second of the different rows on the wafer.

10. The system of claim 9, wherein the computer subsystem is further configured for generating the second computed reference from the images of multiple instances of a third of the patterned areas in the different rows on the wafer.

11. The system of claim 6, wherein generating the first difference images comprises separately subtracting a first computed reference from the images generated for the multiple instances of the first patterned areas in a first of the different rows on the wafer and generating the second difference images comprises separately subtracting a second computed reference from the images generated for the multiple instances of the first patterned areas in a second of the different rows on the wafer.

12. The system of claim 11, wherein the computer subsystem is further configured for generating the first computed reference from the images of multiple instances of a second of the patterned areas in the first of the different rows on the wafer and generating the second computed reference from the images of multiple instances of the second of the patterned areas in the second of the different rows on the wafer.

13. The system of claim 11, wherein generating the third difference images comprises separately subtracting a third computed reference from the multiple instances of the images generated for the first patterned areas in the first of the different rows on the wafer and generating the fourth difference images comprises separately subtracting a fourth computed reference from the images generated for the multiple instances of the first patterned areas in the second of the different rows on the wafer.

14. The system of claim 13, wherein the computer subsystem is further configured for generating the third computed reference from the images of multiple instances of a third of the patterned areas in the first of the different rows on the wafer and generating the fourth computed reference from the images of multiple instances of the third of the patterned areas in the second of the different rows on the wafer.

15. The system of claim 6, wherein generating the first difference images comprises separately subtracting a first computed reference from the images generated for the multiple instances of the first patterned areas in a first of the different rows on the wafer and generating the second difference images comprises separately subtracting a second computed reference from the images generated for the multiple instances of the first patterned areas in the first of the different rows on the wafer.

16. The system of claim 15, wherein the computer subsystem is further configured for generating the first computed reference from the images of multiple instances of a second of the patterned areas in the first of the different rows on the wafer and generating the second computed reference from the images of multiple instances of a third of the patterned areas in the first of the different rows on the wafer.

17. The system of claim 15, wherein generating the third difference images comprises separately subtracting a third computed reference from the images generated for the multiple instances of the first patterned areas in a second of the different rows on the wafer and generating the fourth difference images comprises separately subtracting a fourth computed reference from the images generated for the multiple instances of the first patterned areas in the second of the different rows on the wafer.

18. The system of claim 17, wherein the computer subsystem is further configured for generating the third computed reference from the images of multiple instances of a second of the patterned areas in the second of the different rows on the wafer and generating the fourth computed reference from the images of multiple instances of a third of the patterned areas in the second of the different rows on the wafer.

19. The system of claim 1, wherein generating a first of the different stacked difference images comprises generating first difference images and combining at least a portion of the first difference images to generate the first of the different stacked difference images, and wherein generating a second of the different stacked difference images comprises generating second difference images and combining at least a portion of the second difference images to generate the second of the different stacked difference images.

20. The system of claim 19, wherein generating the first difference images comprises separately subtracting a first computed reference from the images generated for the multiple instances of the first patterned areas in a first of the different rows on the wafer.

21. The system of claim 20, wherein the computer subsystem is further configured for generating the first computed reference from the images of multiple instances of a second of the patterned areas in the first and a second of the different rows on the wafer.

22. The system of claim 20, wherein generating the second difference images comprises separately subtracting a second computed reference from the images generated for the multiple instances of the first patterned areas in a second of the different rows on the wafer.

23. The system of claim 22, wherein the computer subsystem is further configured for generating the second computed reference from the images of multiple instances of a third of the patterned areas in the first and second of the different rows on the wafer.

24. The system of claim 1, wherein the computer subsystem is further configured for performing said generating and detecting for a first and a second of the different rows on the wafer, separately performing said generating and detecting for the second and a third of the different rows on the wafer, and inputting the results of both of the detecting steps into the identifying step.

25. The system of claim 1, wherein identifying the defects on the reticle comprises determining a local image characteristic at the location in each of the images of the multiple instances of the first patterned areas, comparing the determined local image characteristic at the location in each of the images of the multiple instances of the first patterned areas to a threshold, determining a number of the images of the multiple instances of the first patterned areas having the determined local image characteristic above the threshold, and comparing the determined number to a repeater threshold.

26. The system of claim 1, wherein the reticle is a single die reticle.

27. The system of claim 1, wherein the reticle is a multiple die reticle.

28. The system of claim 1, wherein the reticle is configured for use at an extreme ultraviolet wavelength.

29. A non-transitory computer-readable medium, storing program instructions executed on a computer system for performing a computer-implemented method for detecting defects on a reticle, wherein the computer-implemented method comprises:

acquiring images generated for a wafer by an inspection subsystem, wherein a reticle is used to print patterned areas on the wafer in a lithography process, and wherein the patterned areas comprise first patterned areas corresponding to the same area on the reticle and printed in different rows on the wafer;

generating different stacked difference images for multiple instances of the first patterned areas in the different rows based on the images generated for the first patterned areas in the different rows by the inspection subsystem;

detecting defect candidates in the multiple instances of the first patterned areas on the wafer by applying a defect detection method to the different stacked difference images, wherein the defect detection method determines that a defect candidate is present at a location in each of the multiple instances of the first patterned areas only when the defect detection method detects the defect candidate at the location in the different stacked difference images; and identifying defects on the reticle based on the detected defect candidates, wherein said acquiring, generating, detecting, and identifying are performed by the computer system coupled to the inspection subsystem.

30. A computer-implemented method for detecting defects on a reticle, comprising:

acquiring images generated for a wafer by an inspection subsystem, wherein a reticle is used to print patterned areas on the wafer in a lithography process, and wherein the patterned areas comprise first patterned areas corresponding to the same area on the reticle and printed in different rows on the wafer;

generating different stacked difference images for multiple instances of the first patterned areas in the different rows based on the images generated for the first patterned areas in the different rows by the inspection subsystem;

detecting defect candidates in the multiple instances of the first patterned areas on the wafer by applying a defect detection method to the different stacked difference images, wherein the defect detection method determines that a defect candidate is present at a location in each of the multiple instances of the first patterned areas only when the defect detection method detects the defect candidate at the location in the different stacked difference images; and identifying defects on the reticle based on the detected defect candidates, wherein said acquiring, generating, detecting, and identifying are performed by a computer system coupled to the inspection subsystem.

* * * * *